(12) United States Patent
Younggren et al.

(10) Patent No.: US 10,830,324 B2
(45) Date of Patent: Nov. 10, 2020

(54) VEHICLE LAYOUT WITH A CONTINUOUSLY VARIABLE TRANSMISSION

(71) Applicant: TEAM Industries, Inc., Bagley, MN (US)

(72) Inventors: Bruce H. Younggren, Bagley, MN (US); John Edward Hamrin, Bagley, MN (US); Joel Dunlap, Bagley, MN (US); Brandon P. Lenk, Bagley, MN (US); Gary Allen Johnson, Mahnomen, MN (US)

(73) Assignee: TEAM Industries, Inc., Bagley, MN (US)

( * ) Notice: Subject to any disclaimer, the term of this patent is extended or adjusted under 35 U.S.C. 154(b) by 49 days.

(21) Appl. No.: 16/141,227

(22) Filed: Sep. 25, 2018

(65) Prior Publication Data
US 2019/0093745 A1 Mar. 28, 2019

Related U.S. Application Data

(60) Provisional application No. 62/563,496, filed on Sep. 26, 2017.

(51) Int. Cl.
*F16H 37/08* (2006.01)
*F16H 57/04* (2010.01)
(Continued)

(52) U.S. Cl.
CPC ......... *F16H 37/0846* (2013.01); *B60K 6/383* (2013.01); *B60K 6/387* (2013.01);
(Continued)

(58) Field of Classification Search
CPC .. F16H 37/0846; F16H 37/086; F16H 57/043; F16H 57/0489; B60K 6/383;
(Continued)

(56) References Cited

U.S. PATENT DOCUMENTS 6,461,268 B1* 10/2002 Milner ................... F16H 15/50
475/183
8,469,856 B2* 6/2013 Thomassy ............... F16H 15/28
476/40
(Continued)

FOREIGN PATENT DOCUMENTS

CA 2456633 A1 7/2004
DE 20014160 U1 11/2001
(Continued)

OTHER PUBLICATIONS

International Searching Authority, "International Search Report and Written Opinion from PCT Application No. PCT/US2018/052607 dated Dec. 20, 2018", from Foreign Counterpart to U.S. Appl. No. 16/141,227, pp. 1-13, Published: US.
(Continued)

*Primary Examiner* — Leslie A Nicholson, III
(74) *Attorney, Agent, or Firm* — Fogg & Powers LLC

(57) ABSTRACT

A vehicle layout including a motor, a continuously variable transmission (CVT), an actuator, a controller, a drivetrain and at least one clutch is provided. The motor provides engine torque. The CVT is operationally coupled to receive the engine torque. The actuator is configured to control a gearing ratio of the CVT. The controller activates the actuator based at least in part on an input. The drivetrain is in operational communication with the CVT. The at least one clutch is configured to selectively disconnect torque between at least one of the motor and the CVT and the CVT and the drivetrain.

14 Claims, 26 Drawing Sheets

(51) Int. Cl.
  *F16H 15/14* (2006.01)
  *B60K 6/547* (2007.10)
  *B60K 6/387* (2007.10)
  *B60K 6/383* (2007.10)
  *B60K 6/48* (2007.10)

(52) U.S. Cl.
  CPC .............. *B60K 6/48* (2013.01); *B60K 6/547* (2013.01); *F16H 15/14* (2013.01); *F16H 37/086* (2013.01); *F16H 57/043* (2013.01); *F16H 57/0489* (2013.01); *B60K 2006/4825* (2013.01); *B60K 2006/4841* (2013.01)

(58) Field of Classification Search
  CPC .......... B60K 6/387; B60K 6/48; B60K 6/547; B60K 2006/4825; B60K 2006/4841
  USPC ........................................................ 475/189
  See application file for complete search history.

(56) References Cited

U.S. PATENT DOCUMENTS

| | | | | |
|---|---|---|---|---|
| 8,620,539 | B2* | 12/2013 | Urata | F16H 37/022 701/51 |
| 8,870,711 | B2* | 10/2014 | Pohl | F02B 67/04 477/37 |
| 9,388,884 | B2* | 7/2016 | Hibino | F16H 57/049 |
| 2007/0144283 | A1 | 6/2007 | Hasegawa et al. | |
| 2011/0028260 | A1 | 2/2011 | Kawasaki et al. | |
| 2013/0096790 | A1 | 4/2013 | Nelson | |
| 2018/0363763 | A1* | 12/2018 | Pohl | F16H 57/0484 |

FOREIGN PATENT DOCUMENTS

| | | |
|---|---|---|
| EP | 0063786 A1 | 11/1982 |
| EP | 0787927 A2 | 8/1997 |
| EP | 2275706 A1 | 1/2011 |
| JP | 2013167322 A | 8/2013 |
| WO | 2007135428 A1 | 11/2007 |
| WO | 2017049049 A1 | 3/2017 |

OTHER PUBLICATIONS

International Searching Authority, "International Search Report and Written Opinion from PCT Application No. PCT/US2020/019068", from Foreign Counterpart to U.S. Appl. No. 16/796,488, dated Apr. 20, 2020, pp. 1 through 13, Published: WO.

\* cited by examiner

VEHICLE LAYOUT WITH A CONTINUOUSLY VARIABLE TRANSMISSION

CROSS-REFERENCE TO RELATED APPLICATIONS

This Application claims priority to U.S. Provisional Application Ser. No. 62/563,496, same title herewith, filed on Sep. 26, 2017, which is incorporated in its entirety herein by reference.

BACKGROUND

Transmission systems interface engine torque from a motor into a desired torque applied to a drivetrain of a vehicle given current operating conditions. An example of a type of transmission is a continuously variable transmission (CVT). There are several different types of CVTs. For example, CVT types include a variable-diameter (belt) CVTs, hydrostatic CVTs and toroidal CVTs. In a belt CVT type of transmission the gearing of the transmission continuously changes based on the then current torque passing through the CVT. One type of a CVT is a belt CVT. A belt CVT includes a primary clutch (drive clutch) and a secondary clutch (driven clutch) that are in rotational communication with each other via a belt or other type of endless loop device. The primary clutch is coupled to receive torque provided by an engine while secondary clutch is coupled to a drivetrain of a vehicle which may include a further portion of a transmission. The primary clutch and secondary clutch are designed to change gear ratios based on the torque that they are experiencing. In particular, in response the torque, a movable sheave portion is moved away from or towards a fixed sheave portion of the respective primary and secondary clutches to move the belt towards or away from a rotational axis of the respective primary and secondary clutches. Another type of CVT is a NuVinci CVT or NuVinci continuously variable planetary (CVP). In this design, gear ratio control is accomplished by changing relative angles of a pair of carriers engaging balls in response to a current torque experienced by the CVT.

SUMMARY

The following summary is made by way of example and not by way of limitation. It is merely provided to aid the reader in understanding some of the aspects of the subject matter described. Embodiments provide novel layouts for a vehicle including a CVT and clutch.

In one embodiment, a vehicle layout including a motor, a continuously variable transmission (CVT), an actuator, a controller, a drivetrain and at least one clutch is provided. The motor provides engine torque. The CVT is operationally coupled to receive the engine torque. The actuator is configured to control a gearing ratio of the CVT. The controller activates the actuator based at least in part on an input. The drivetrain is in operational communication with the CVT. The at least one clutch is configured to selectively disconnect torque between at least one of the motor and the CVT and the CVT and the drivetrain.

In another embodiment, another vehicle layout is provided. The vehicle layout includes a motor, a continuously variable transmission (CVT), an actuator, a controller, a drivetrain and at least one starter clutch. The motor provides engine torque. The CVT is operationally coupled to receive the engine torque. The actuator is configured to control a gearing ratio of the CVT. The controller is configured to activate the actuator based at least in part on an input. The drivetrain is in operational communication with the CVT. The at least one starter clutch is positioned between the motor and CVT to selectively connect and disconnect torque between the motor and the CVT to allow the engine to idle without transferring torque to the drivetrain.

In still another embodiment, a vehicle layout including a motor to provide engine torque, a continuously variable transmission (CVT), an actuator, a controller, a drivetrain and at least one clutch is provided. The CVT is operationally coupled to receive the engine torque. The actuator is configured to control a gearing ratio of the CVT. The controller is configured to activate the actuator based at least in part on an input. The drivetrain is in operational communication with the CVT. The at least one clutch is positioned between the CVT and the drivetrain to selectively connect and disconnect torque between the CVT and the drivetrain.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide layouts of a vehicle with a continuously variable transmission (CVT) such as, but not limited to a toroidal CVT or NuVinci CVT (which can be also referred to as a Continuously Variable Planetary (CVP)) into an all-terrain vehicle (ATV), Utility task vehicle (UTV), Side by Side vehicle, motor vehicle, etc.

Figure 1:
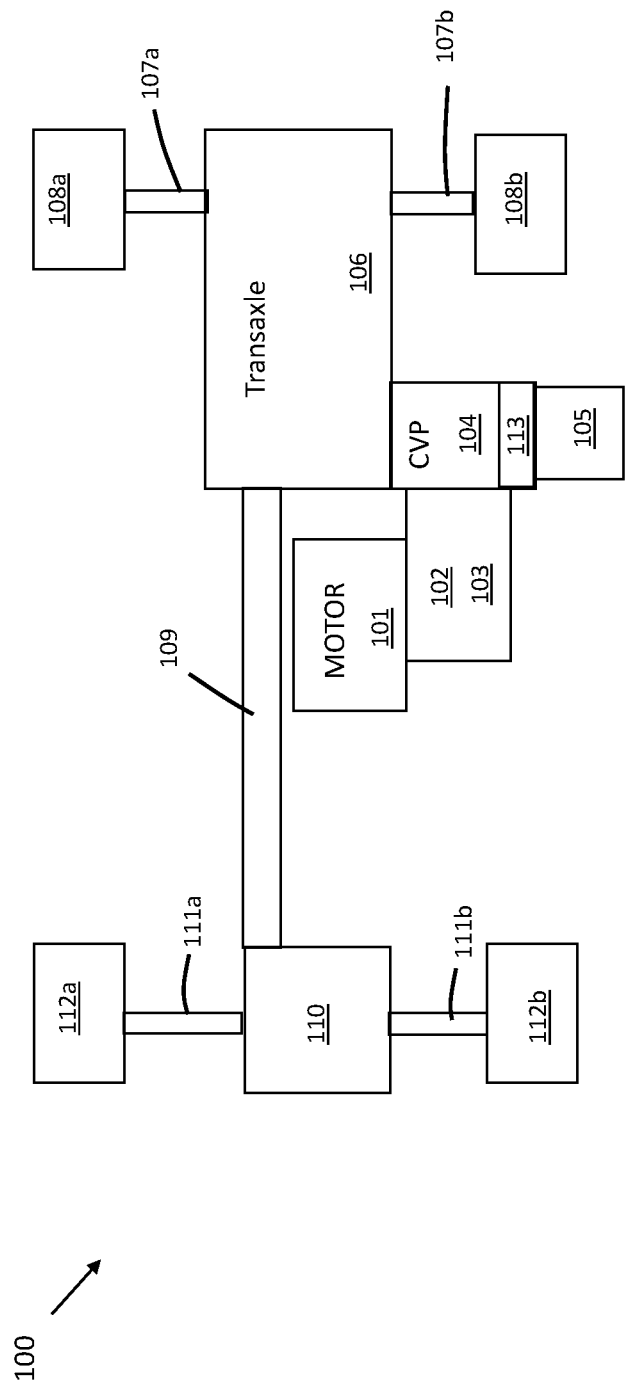
FIG. 1 illustrates a block diagram of a first vehicle layout according to one exemplary embodiment.

A first example of a vehicle layout 100 including a CVT is illustrated in FIGS. 1-8. In this embodiment, a motor 101 is transversely mounted. This may be either an internal combustion engine, an electric motor or any other type of motor generating engine torque. FIG. 1 illustrates a block diagram of the vehicle 100. In this first example layout, a starter clutch 102 is in direct communication with the motor 101 to receive engine torque. This allows the motor 101 to idle without engaging the drivetrain. As the motor 101 increases RPM when the throttle is applied, the starter clutch 102 will engage. Starter clutch 102 may be any type of starter clutch such as, but not limit to shoe style clutches, plate style clutches, mechanically style clutches or electrically controlled clutches. Regardless, the starter clutch 102 engages as the motor 101 increases RPM and disengages when the RPM drop to a certain level to allow the engine 101 to idle without delivering power to the wheels or stalling out the motor 101. In an embodiment, a one-way clutch 140 (best illustrated in the close up cross-sectional view of the start clutch area of FIG. 6) is used in the starter clutch area to achieve engine braking through the drive. In this example, the one-way clutch is mounted between a central starter clutch shaft 141 of the start clutch 140 and a torque transfer member 143 that is rotationally coupled to a pulley/gear 130a of a gear reduction assembly 130 discussed below. In another embodiment, a torsional damper is included in this starter clutch area to smooth out engine torque pulses. In an electric motor embodiment, the starter clutch portion 102 may not be necessary.

An output torque of the starter clutch 102 may be run through a gear reduction assembly 103 (gears, belts or chains). The gear reduction assembly 103 in this example embodiment includes a pulley/gear 103a and an endless looped belt/chain 103b that couples rotation of the starter clutch 102 to an input side of a CVT, such as but not limited to, a CVP 104 in this example embodiment includes a pulley/gear 103c. Also illustrated in the block diagram of FIG. 1 is a CVP actuator 113 and a control unit such as a transmission control unit (TCU). The actuator 113 and control unit 105 are used to control operations of the CVP. The CPV 104 is in rotational communication a transaxle 106. The transaxle 106 in turn is rotational coupled to half shafts 107a and 107b and rear wheels that include tires 108a and 108b. The transaxle 106 is further rotationally coupled to prop shaft 109. The prop shaft 109 in turn is rotationally coupled to a front gear case 110. The front gear case 110 in turn is coupled to front half shafts 111a and 111b and associated front wheels that include front tires 112a and 112b.

Figure 2:
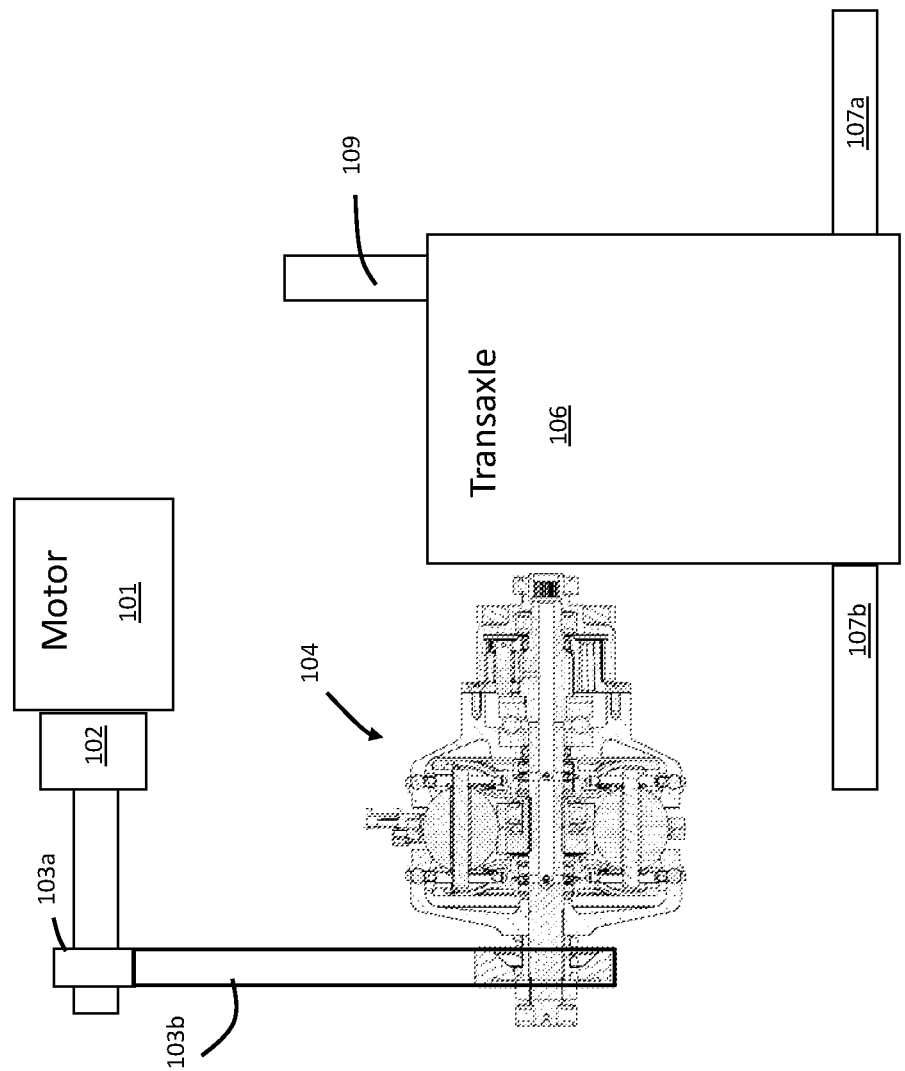
FIG. 2 is a partial block diagram of the vehicle layout of FIG. 1 including a cross-sectional view of a CVP according to one exemplary embodiment.
Figure 3:
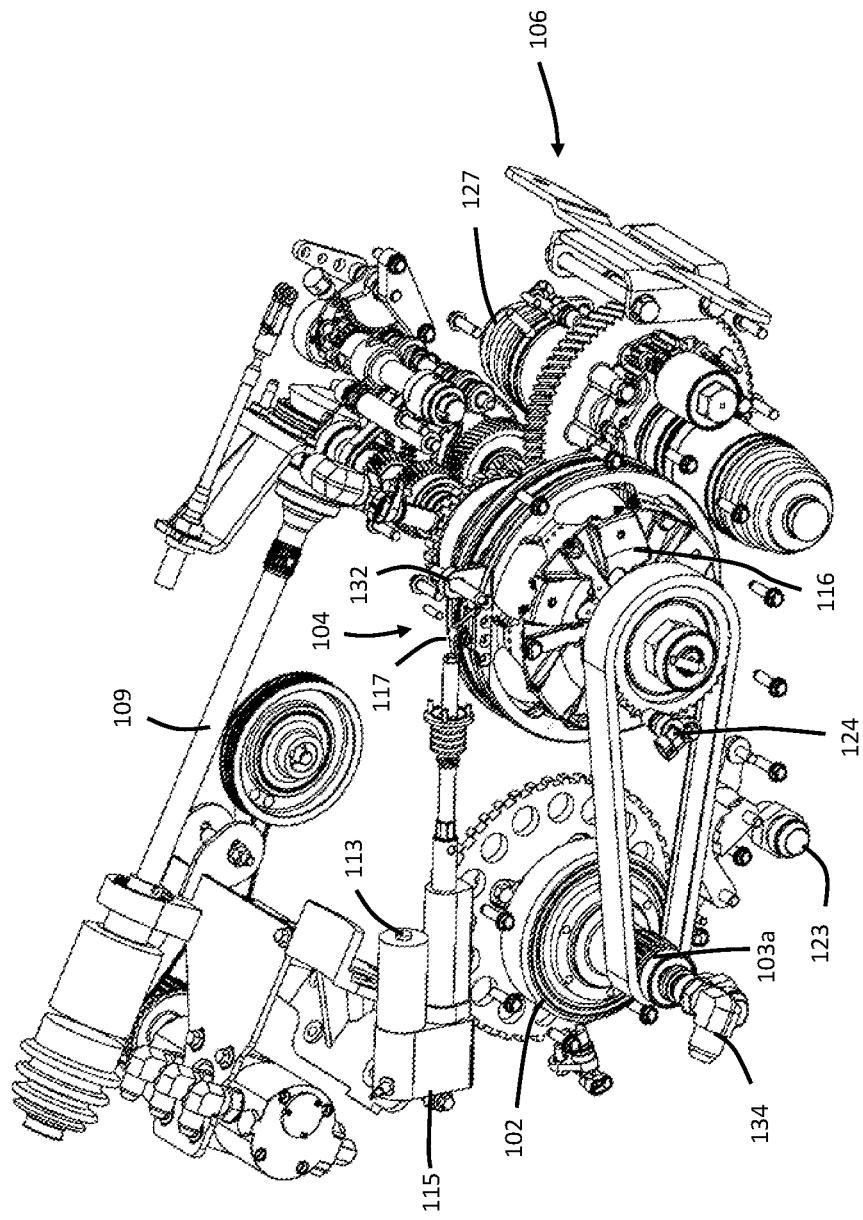
FIG. 3 is a side perspective view of some components of a drivetrain of the vehicle layout of FIG. 1 according to one exemplary embodiment.
Figure 4:
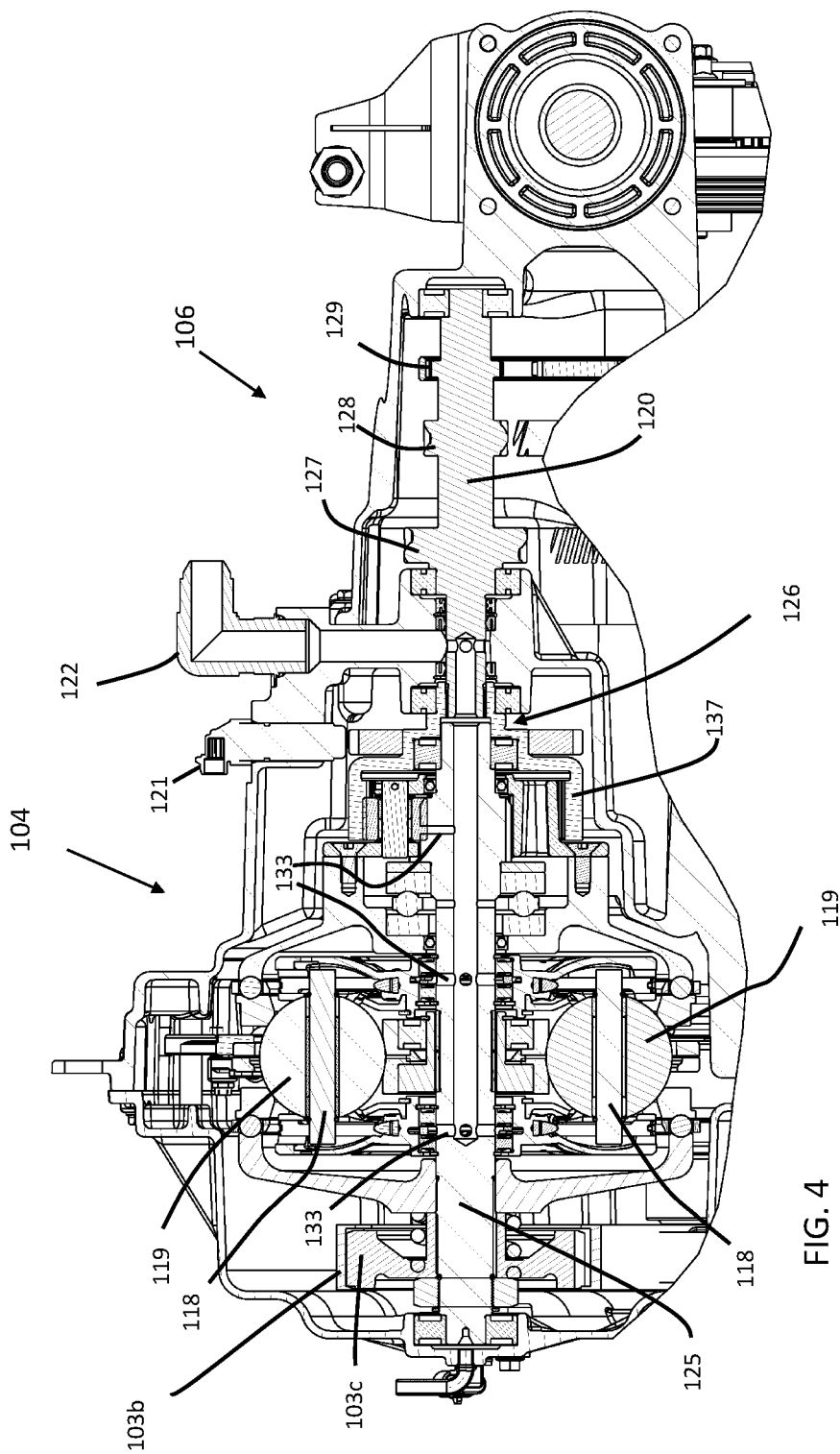
FIG. 4 is a cross-sectional side view of portions of a CVP and transaxle according to one exemplary embodiment.
Figure 5:
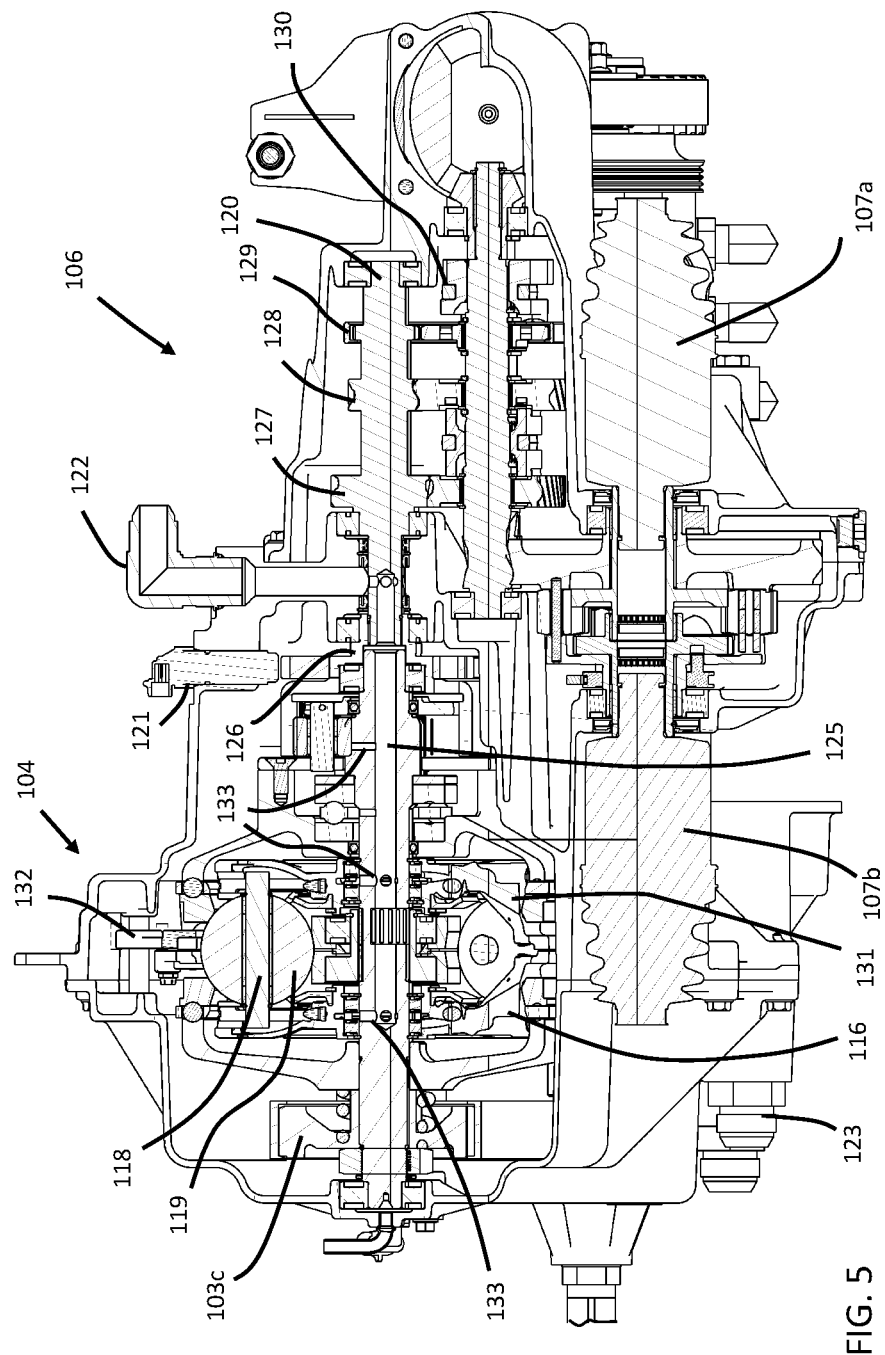
FIG. 5 is another cross-sectional side view of portions of the CVP and transaxle according to one exemplary embodiment.
Figure 6:
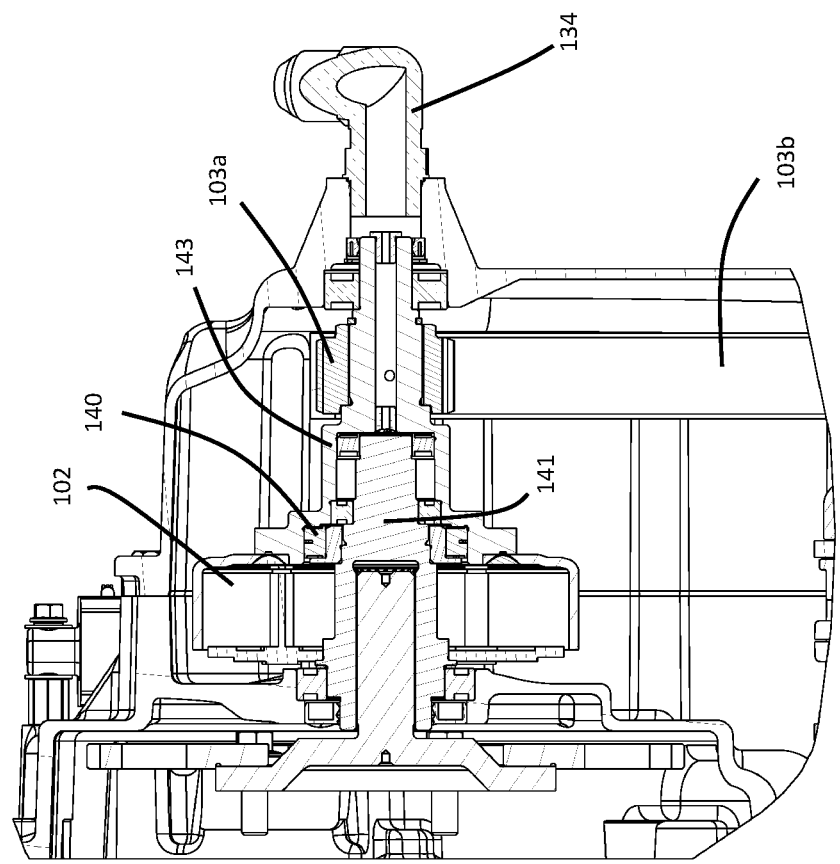
FIG. 6 is a close up partial cross-sectional view of a starter clutch and gear reduction system according to one exemplary embodiment.
Figure 7:
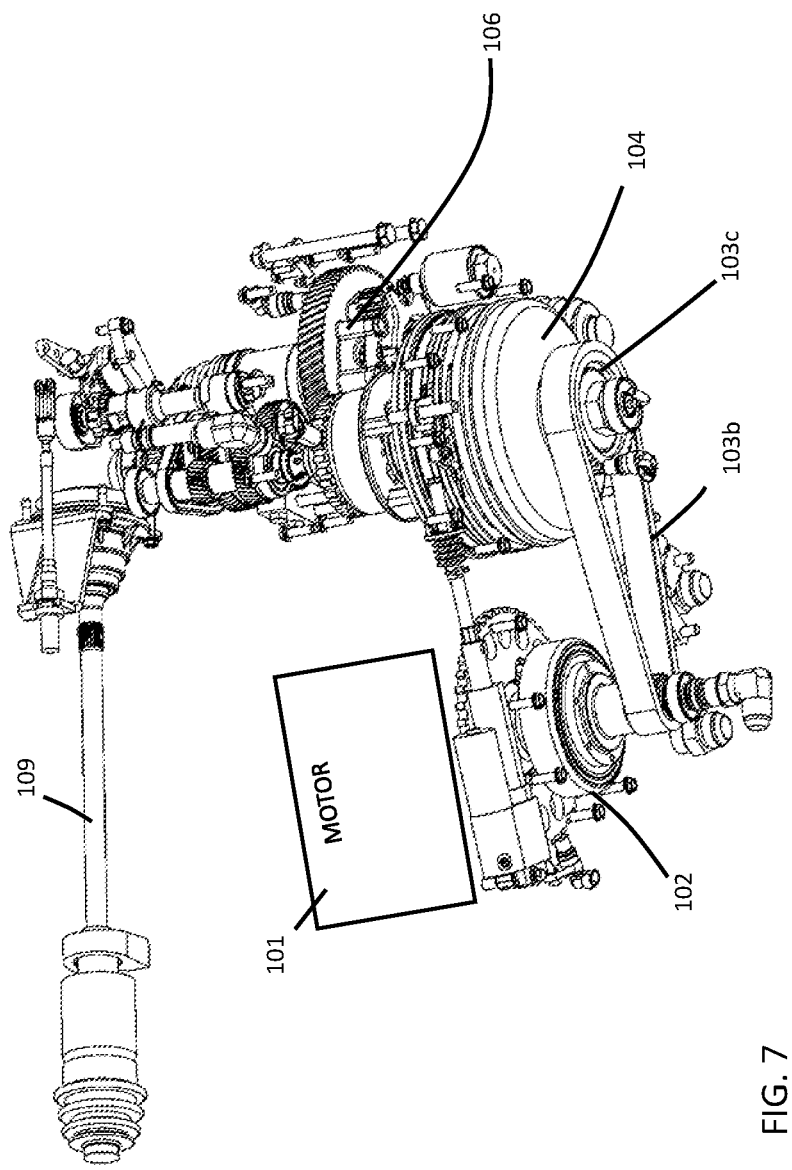
FIG. 7 is a side perspective view of some components that make up at least part of a drivetrain of the vehicle of FIG. 1 according to one exemplary embodiment.
Figure 8:
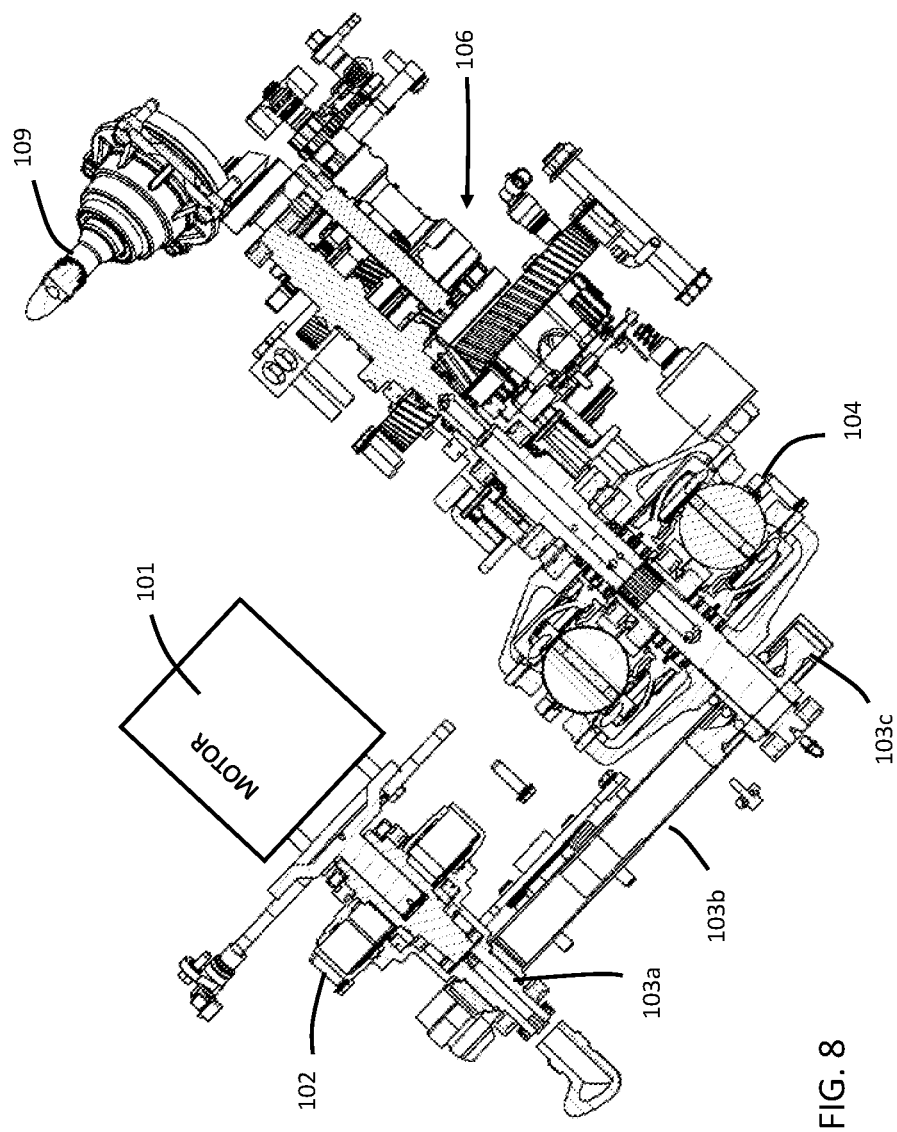
FIG. 8 is another perspective view of some components that make up at least part of a drivetrain of the vehicle layout of FIG. 1 according to one exemplary embodiment.

Further details of component embodiments of the first example of layout of a vehicle 100 are described in view of FIGS. 2-8. In particular, FIG. 2 illustrates the components of a CVP 104 and how they are aligned with further components of the vehicle in an embodiment. FIG. 3 illustrates side perspective view of some components that make up at least part of a drivetrain of vehicle 100 discussed above. FIGS. 4 and 5 illustrate a cross-sectional view of portions of the CVP 104 and the transaxle 106. FIG. 6 illustrates a close up partial cross-sectional view of the starter clutch 102 and gear reduction system which in this example includes belt/chain 103b and gear/pulley 103a. FIG. 7 also illustrates a side perspective view of some components that make up at least part of a drivetrain of vehicle 100 discussed above and FIG. 8 illustrates some components, cross-sectional view, that make up at least part of a drivetrain of vehicle 100.

In an embodiment, input toque to the CVP 104 is provided to the main shaft 125 (shown best in FIG. 4) of the CVP 104. Torque (power) flows through the NuVinci CVP 104 and exits the CVP 104 at the CVP Output 126 via CVP member 137. In a NuVinci CVP design, gear ratio control is accomplished by changing relative angles of a pair of carriers engaging balls in response to a current torque experienced by the CVT as known in the art. In an embodiment, an additional torque recirculation path with a planetary assembly is used. This torque recirculation path is used to get a larger ratio span from the CVT. This can be any type of planetary. In another embodiment that does not need an expanded ratio span, a planetary may not be used.

The CVP actuator 113 is an electric actuator 113 in one example embodiment. The activation of the actuator 113 in turn is controlled by the TCU 105. In embodiments the TCU 105 may also be integrated into the vehicle level controller or into the engine control unit (ECU). In an embodiment, one end of the electric actuator 113 is connected to the gear case at 115 as best illustrated in FIG. 3. The electric actuator 113 is connected to the carrier 116 of the CVP 104 at position 117. A second carrier 131 (best illustrated in FIG. 5) is locked rotationally to a transmission case at point 132. As is well known in the area of the NuVinci CVP, as the first carrier 116 is moved or rotated about its axis the axles 118 of the balls 119 move to a different angle thereby changing the CVP ratio. Many actuation methods exist to create the relative motion between the two carriers and any method of creating this relative motion between carriers will work with this layout. The TCU 105 based on at least one input controls the ratio in the CVP 104. The input may include an operator input, a throttle position input speed, an output speed, an engine speed, a temperature, lubrication pressure, etc. In some embodiments, an overdrive, underdrive, and 1:1 may be used.

Further in an embodiment, a CVP output 126 is connected to a transaxle 106 as illustrated in FIG. 4. A transaxle 106, in an embodiment, provides gearing of a gear case as well gearing for a differential. In this assembly, the CVP output 126 is connected to the transaxle input shaft 120. This transaxle 106 example includes high 127, low 128, reverse 129, neutral and park 130 gears as best illustrated in FIG. 5. The configuration of where these different gears are located on the shaft may be changed. Moreover, in one embodiment just one forward gear is used. Embodiments may also add a mid-range forward gear. Park 130 in this example assembly is a pawl style park but other types of a parking mechanism may be used. The transaxle has outputs for the left and right rear half shafts 107a and 107b to drive the rear tires 108a and 108b and an output to a front prop shaft 109 that powers the front differential/gearcase 110 as illustrated in FIG. 1. Front half shafts 111a take power from the front differential/ gear case 110 and deliver to the front tires 112.

In embodiments, the NuVinci drive needs oil to function correctly. An oil inlet 122 is used to provide the oil is best illustrated in FIG. 5. Oil flows in through oil inlet 122 and into a central passage in the CVP main shaft 125. Oil is then distributed to different parts of the CVP 104 by lubrication passages 133. Some oil is also shared with the chain reduction 103 and the starter clutch 102 by oil inlet 134 illustrated in FIG. 6. This oil is shown as one oil for the CVP and a different oil for the transaxle. In other embodiments, the CVP and transaxle could use the same oil and share their oil supply. Embodiment further include an oil outlet 123 illustrated in FIG. 3.

In an embodiment, the TCU 105 needs a number of inputs to control the position of the actuator and thereby the ratio of the CVP 104 as discussed above. Speed sensor 121 collects RPM of the CVP output 126. A speed sensor in this location may also determine direction of rotation (clockwise or counterclockwise) of the CVP output 126. This direction of rotation may be used to help control the CVP 104 when rotating the CVP 104 the opposite direction (CW or CCW) than when it is powered by the engine. Another input is speed sensor 124. This measures the RPM of the CVP main shaft 125 or the input to the CVP 104. Again, direction of rotation of the CVP 104 may be determined using this sensor. In using both of these sensors, the ratio of the CVP 104 may be calculated and used by the TCU 105 to determine what position the actuator 113 should be at to control the CVP ratio. CVP 104 in embodiments may be part of a transaxle, transmission or rear drive combination.

Figure 9:
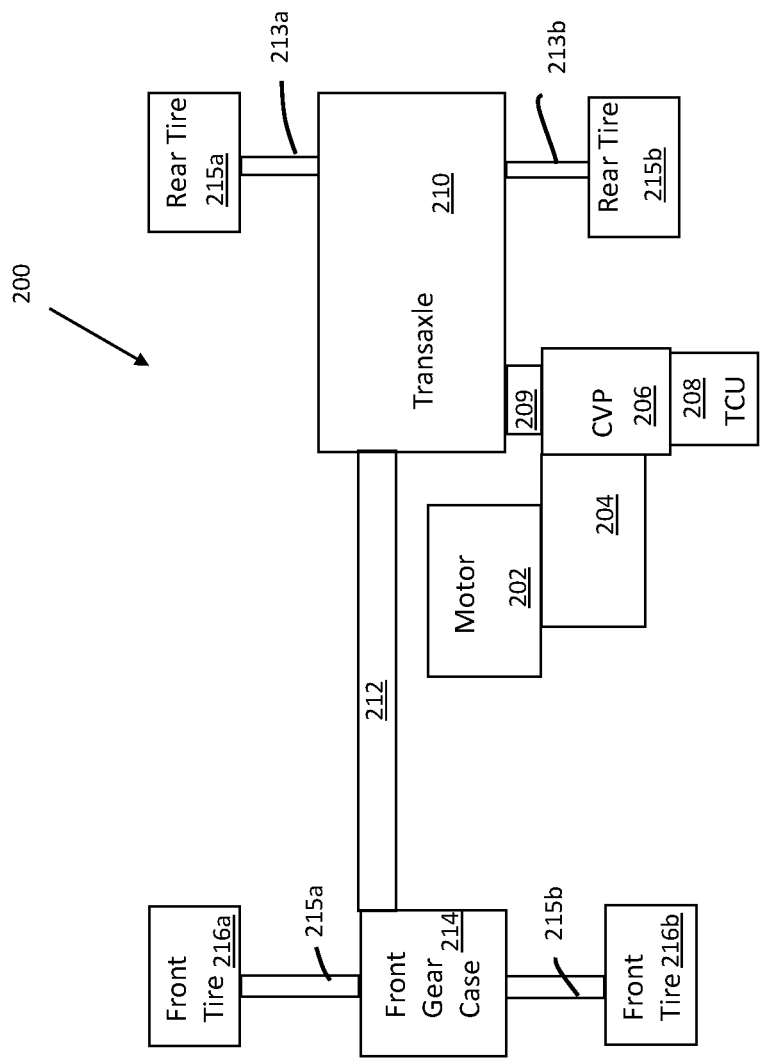
FIG. 9 is a block diagram of a second vehicle layout according to one exemplary embodiment.
Figure 10:
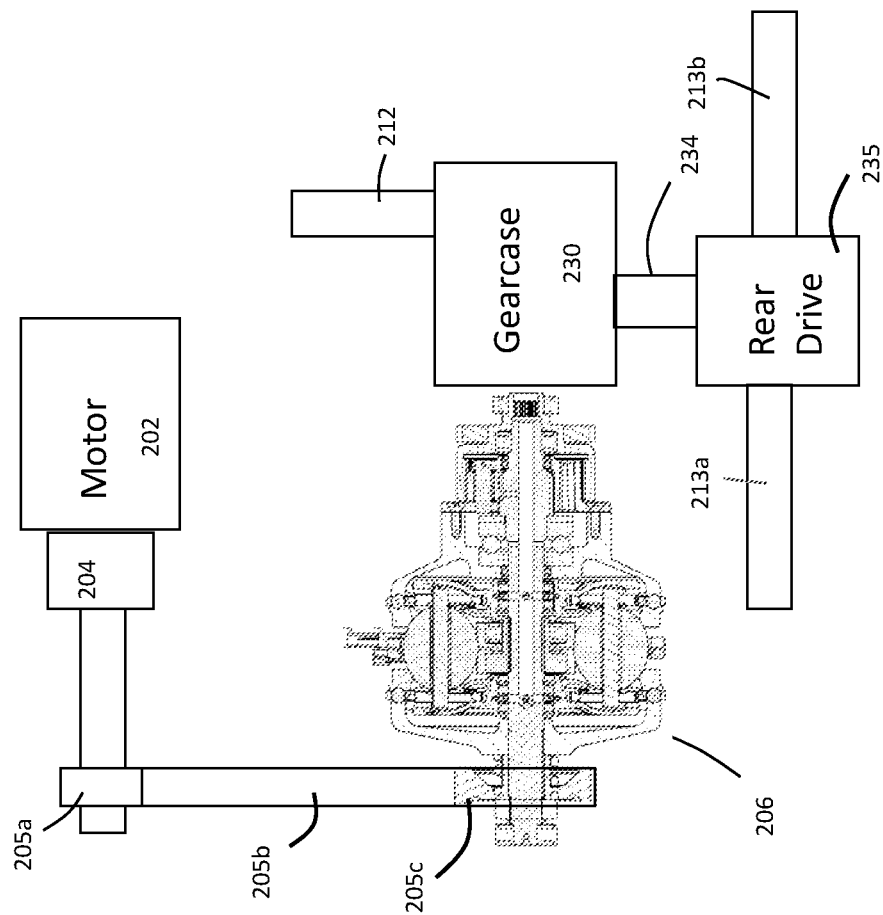
FIG. 10 is a partial block diagram of the vehicle layout of FIG. 9 including a cross-sectional view of a CVP according to one exemplary embodiment.
Figure 11:
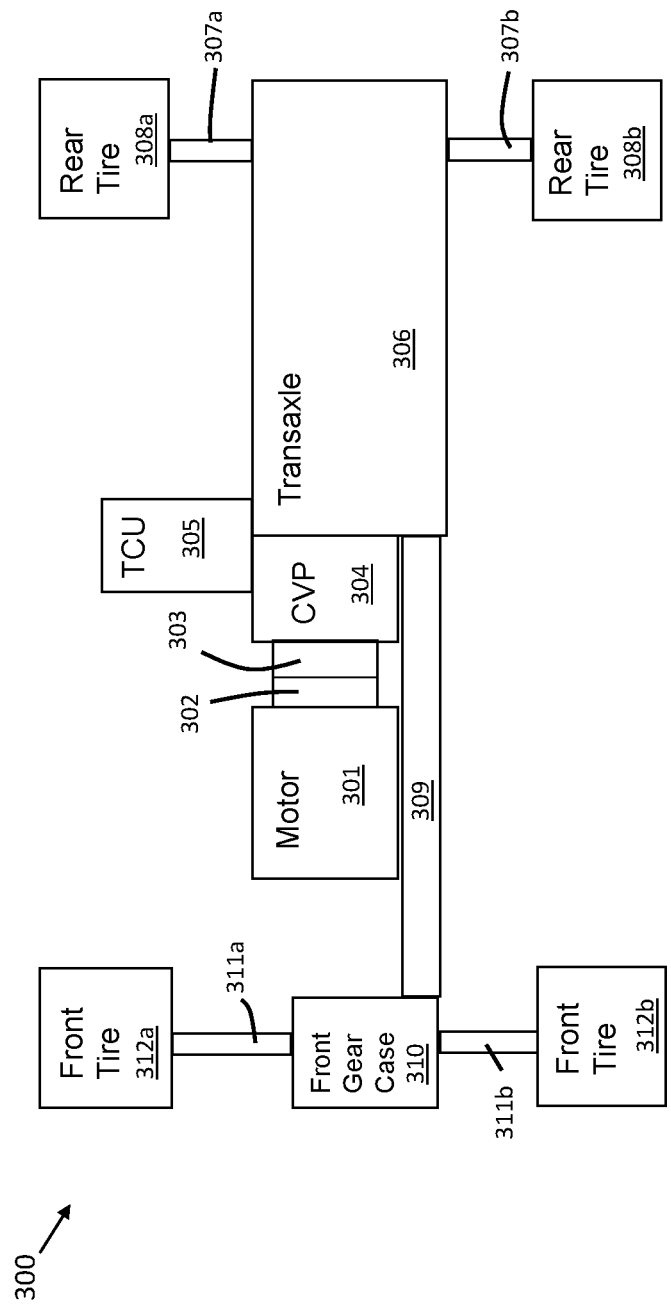
FIG. 11 is a block diagram of a third vehicle layout according to one exemplary embodiment.

A second example layout embodiment of a vehicle 200 is illustrated in FIGS. 9 through 11. This layout consists of a transversely mounted motor 202. This could be an internal combustion engine (ICE) or an electric motor or other type of torque generating motor. Electric motor 202 embodiments may not need the starting clutch.

In the embodiment of FIG. 9, motor torque from motor 202 is provided to starter clutch 204. This allows the motor (engine) 202 to idle without engaging the drivetrain. As the motor 202 is increased in RPM, when the throttle is applied, the starter clutch 204 will engage. Any type of starter clutch 204 may be used including, but not limited to, a shoe style, a motorcycle style, mechanically or electrically engaged. Regardless, the starter clutch 204 engages as the ICE 202 increases RPM and disconnects to allow the engine 202 to idle. In some embodiments a one-way clutch is included in this starter clutch area so engine braking through the drive is accomplished. Moreover in some embodiments, a torsional damper is included in the starter clutch area to smooth out the engine torque pulses.

In some embodiments, a gear reduction (gears, belts or chains) is operationally coupled to the starter clutch. In these embodiments, the gear reduction is operationally coupled to an input side of the CVP 206. The CVP 206 is controlled in this case by an electric actuator that is tied to a transmission control unit (TCU) 208. In some embodiments the TCU 208 may also be integrated into the vehicle level controller or into the engine control unit (ECU).

In this second vehicle layout 200 embodiment of FIG. 9, the CVP 206 is connected to a transaxle (210) by a second clutch 209. This second clutch 209 is a disengaging clutch that will be a normally closed or engaged clutch. For example, assume that when driving the vehicle 200 (forward or reverse) the CVP 206 wants to rotate. A transaxle 210 between the CVP 206 and tires 215a, 215b 216a and 216b moves forward or reverse with the CVP 206 rotating clockwise (CW). When the vehicle is going up a steep hill or rolling down a ramp or getting pushed around a garage, often times the CVP 206 would be rotated in the opposite direction it normally spins when powering the vehicle 200, in this case counter clockwise (CCW). The purpose of the second clutch 209 is to selectively disengage the drivetrain from the CVP 206 to prevent the CVP 206 from spinning CCW. The drivetrain includes the wheels/tires 215a, 215b, 216a and 216b, transaxle 210, rear half shafts 213a and 213b, rear tires 215a and 215b, prop shaft 112, front gear case 214, front half shafts 215a and 215b and front tires 216a and 216b. Therefore when it is determined electrically or mechanically or a combination of both that counterclockwise rotation of the CVP could occur based on the current operating conditions of the vehicle, the second clutch 209 will open up to disengage and decouple the CVP 206 from the rest of the drivetrain. Therefore, the CVP 206 will not be allowed to turn CCW.

Another example embodiment the second layout is illustrated in FIG. 10. In this example embodiment, output torque from the CVP 206 is operationally coupled to a gearcase 230 (transmission). The gear case 230 has a first output that is coupled to a first prop shaft 232 to a front drive assembly and a second output that is coupled to a second prop shaft 234 to a rear drive assembly. The rear drive assembly include a rear differential 235 and half shafts 213a and 213b. FIG. 10 also illustrates the first clutch 204 (starter clutch and/or damper or torque converter in other embodiments) and gear reduction 205 which includes pulley/gear 205a, 205c and belt 205b in this example embodiment.

Figure 12A:
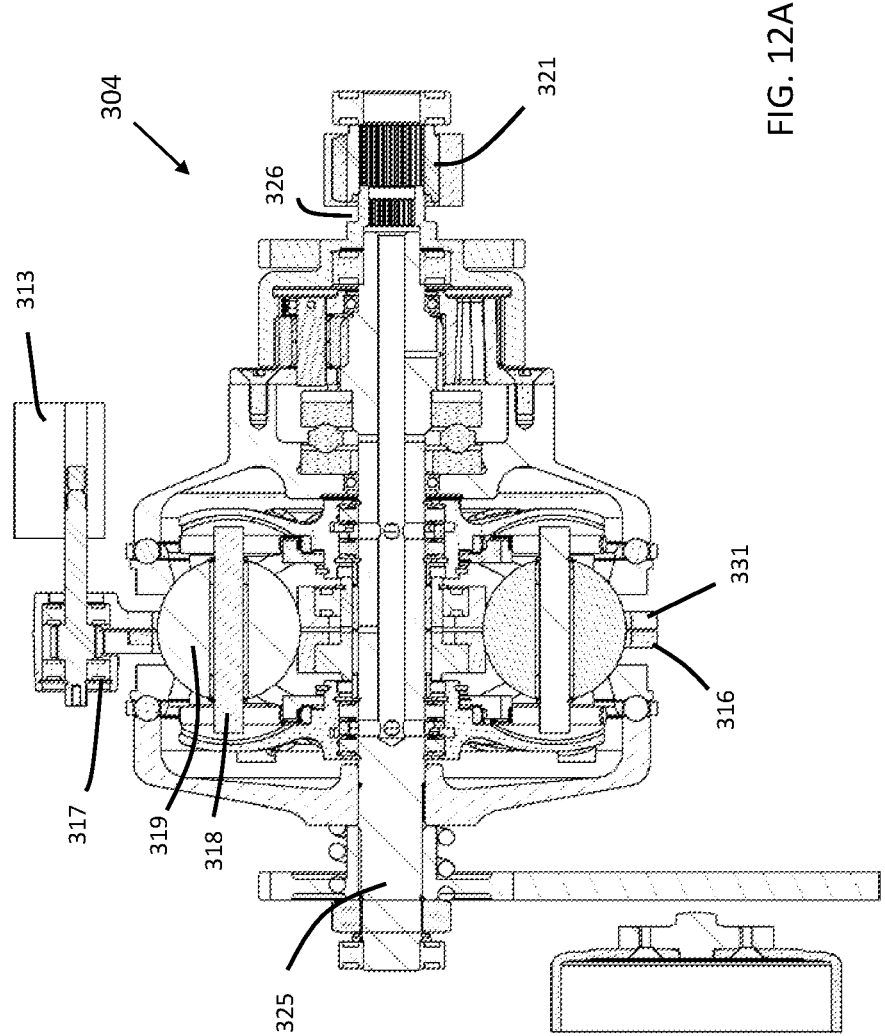
FIG. 12A is a cross-sectional side view of a CVP associated with the third vehicle layout of FIG. 11 according to one exemplary embodiment.
Figure 12B:
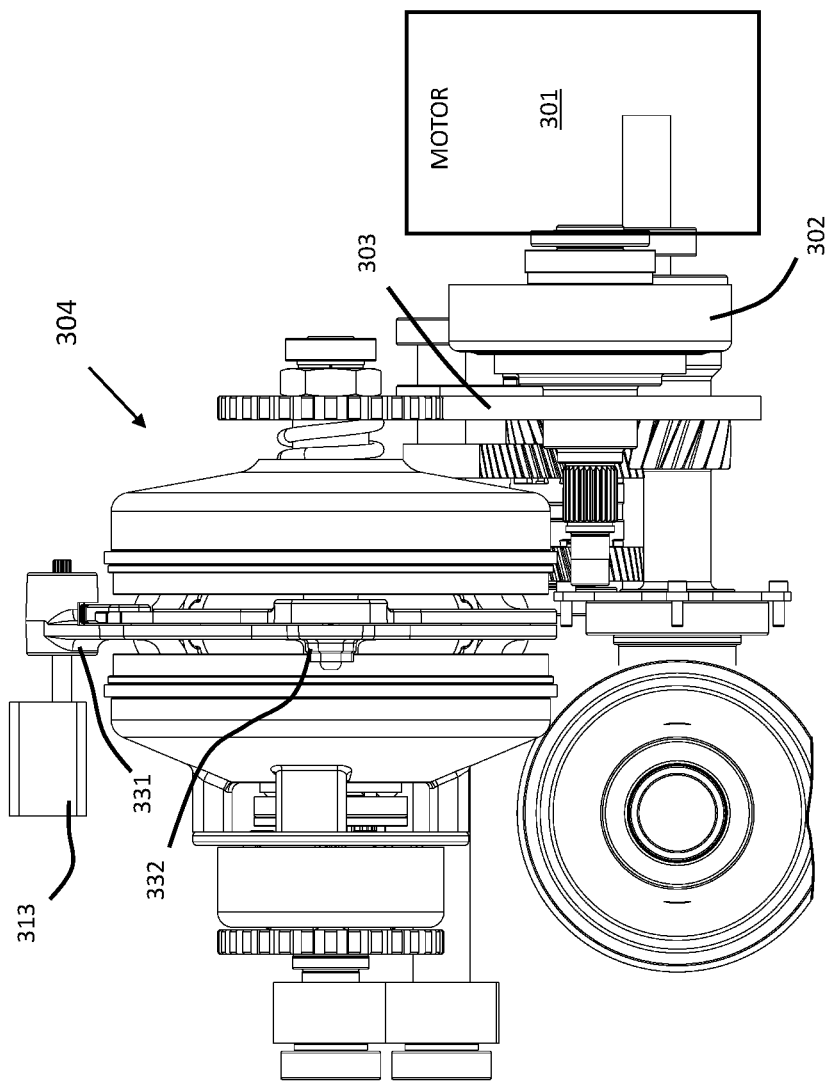
FIG. 12B is a side view of a CVP and starter clutch associated with the third vehicle layout of FIG. 11 according to one exemplary embodiment.
Figure 12C:
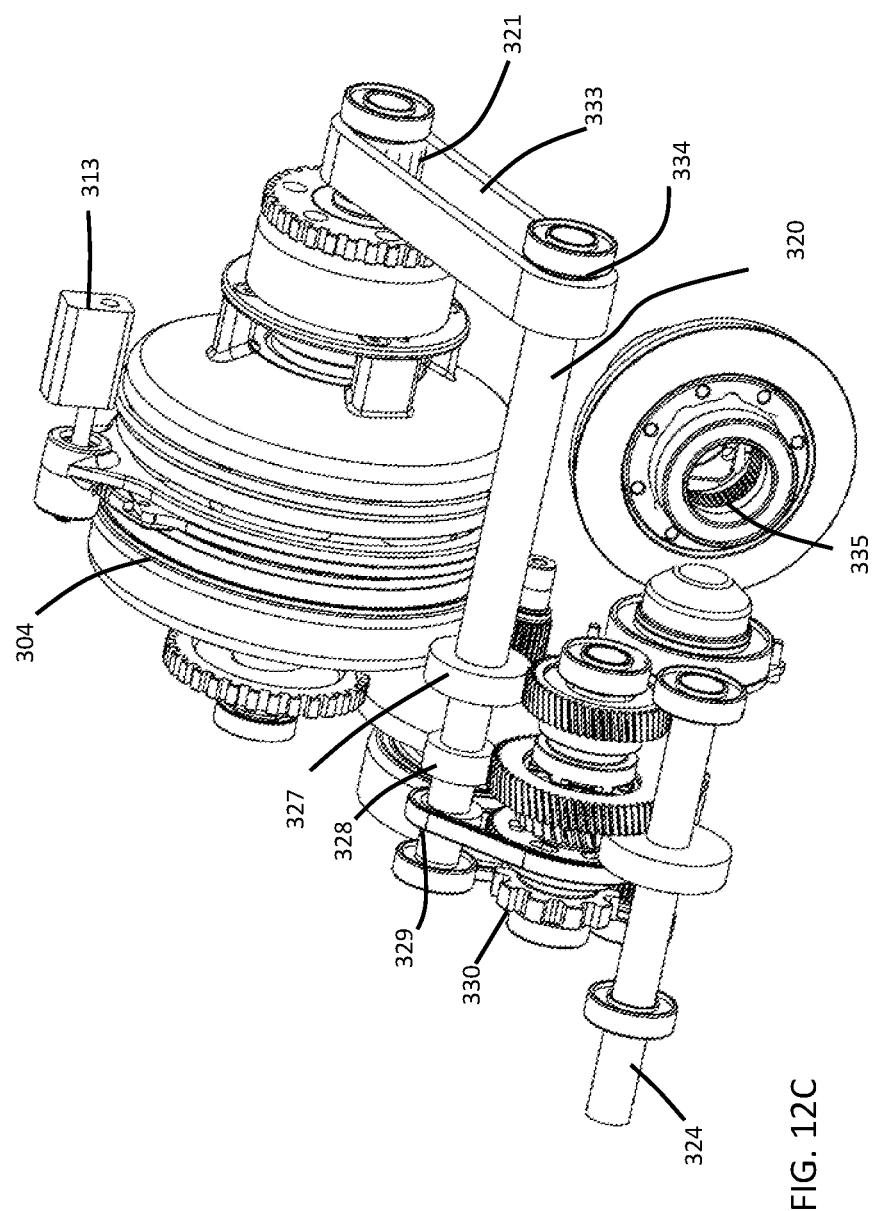
FIG. 12C is a side perspective of components including the CVP associated with the third vehicle layout of FIG. 11 according to one exemplary embodiment.
Figure 12D:
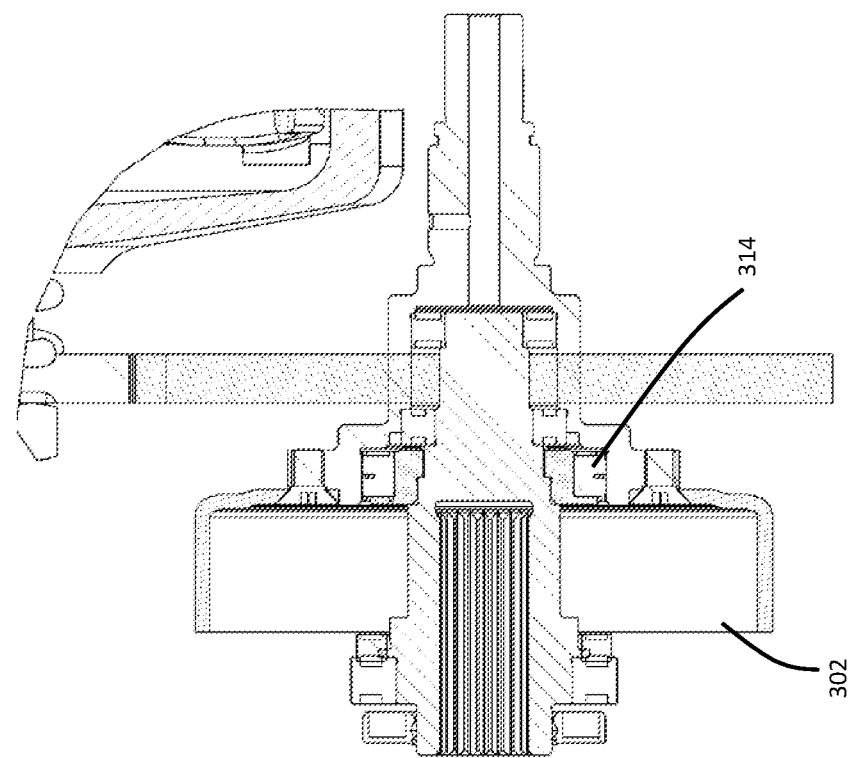
FIG. 12D is a close up cross-sectional side view of the starter clutch associated with the third vehicle layout of FIG. 11 according to one exemplary embodiment.
Figure 12E:
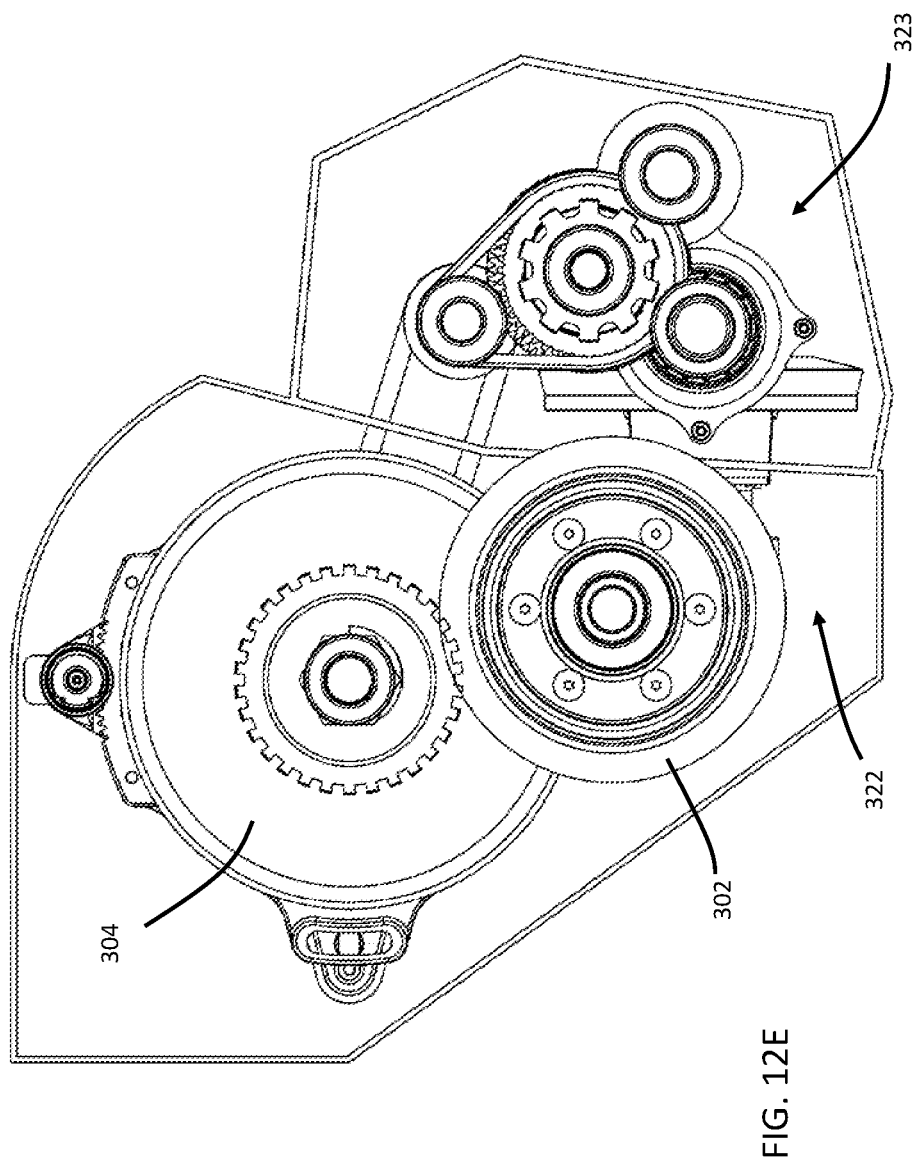
FIG. 12E is a front view of a components associated with the third vehicle layout of FIG. 11 according to one exemplary embodiment.

A third vehicle layout 300 example embodiment is illustrated in FIGS. 11 through 12E. In this example, a transaxle 306 is located longitudinally with the motor 301. As with the other layout examples, the motor 310 may be an ICE, an electric motor or other type of torque generating motor. Referring to FIG. 11 a block diagram of a vehicle 300 implementing the third layout example is provided. Motor torque from motor 301 is provided to starter clutch 302. This allows the engine 301 to idle without engaging the drivetrain. As a throttle is applied the RPM of the engine 301 is increased causing the starter clutch 302 to engage. Any type of starter clutch 302 may be used in this embodiment including, but not limited to, a shoe style, a motorcycle style, mechanically or electrically engaged. Regardless, the starter clutch 302 engages as the motor 301 increases RPM and disengages as the motor 301 decreases RPMs to allow the motor 301 to idle without delivering power to the wheels or stalling the motor 301. In some embodiments, a one-way clutch 314 (illustrated in FIG. 12D) is included in this starter clutch area so engine braking through the drive is accomplished. Moreover in some embodiments, a torsional damper is included in the starter clutch area to smooth out the engine torque pulses. In an embodiment that uses an electric motor 301, a starter clutch 302 may not be necessary.

In some embodiments, a gear reduction assembly (gears, belts or chains) 303 are operationally coupled to the starter clutch 302. In these embodiments, the gear reduction assembly is operational couple to an input side of the CVP 304 and power the main shaft 325 of the CVP 304. The main shaft 325 is best illustrated in FIG. 12A. Torque (power) flows through the CVP 304 and exits the CVP 304 at a CVP output 326. How the CVP 304 transfers power is well known in the art.

The CVP 304 ratio is controlled in this case by an electric actuator that is controlled by a transmission control unit (TCU) 305. In some embodiments the TCU 305 may also be integrated into the vehicle level controller or into the engine control unit (ECU). In an embodiment, a body of the actuator 313 is connected to a gear case. The electric actuator 313 is connected to a carrier 316 of the CVP 304 through gear teeth 317 as best illustrated in the cross-sectional view of the CVP 304 of FIG. 12A. A second carrier 331 is locked rotationally to a transmission case at point 332 illustrated in the side view of the CVP of FIG. 12B. As is well known in the art of the NuVinci CVP, as the first carrier 316 is moved or rotated about its axis the axles 318 of the balls 319 move to a different angle thereby changing the CVP ratio. Many actuation methods exist to create the relative motion between the two carriers but the method of creating this relative motion between carriers is not restricted to this example.

In this third layout embodiment, a CVP 304 output is operationally coupled to a transaxle 306. The CVP output 326 is connected to a transaxle 306. In this assembly, the CVP output 326 is connected to a sprocket 321 as best illustrated in FIG. 12C. A chain 333 connects two sprockets 321 and 334 and delivers power from the CVP 304 to the transaxle input shaft 320. This gearcase in this example has a high gear 327, a low gear 328, a reverse sprocket and chain assembly 329, a neutral and a park feature 330. The configuration of where these different gears and features are located on the shaft can be changed. An embodiment may also run with just one forward gear. Moreover, in an embodiment, a mid-range forward gear is included. Park feature 330 in the example assembly illustrated in FIG. 12C is a pawl style park but other types of a parking mechanism could be used. The gearcase 306 in this example, has a front output shaft 324 for the front prop shaft 309 and rear differential outputs 335 for the rear half shafts 307. The front prop shaft 309 powers the front differential/gearcase 310. Front half shafts 311a and 311b take power from the front differential/gearcase 310 and deliver to the front tires 312a and 312b through front half shafts 311a and 311b. The rear half shafts 307a and 307b take power from the rear differential outputs 335 and power the rear tires 308a and 308b.

The NuVinci drive needs oil to function correctly. In the third layout embodiments, the CVP is located in a wet sump 322 having its own cavity and the gearcase 306 with a different oil and different sump 323 as best illustrated FIG. 12E. Oil routing would be similar to what was described in the first layout embodiments. In another embodiment the oils are combined into one common sump. Further in another embodiment the CVP cavity is a dry sump.

Figure 13:
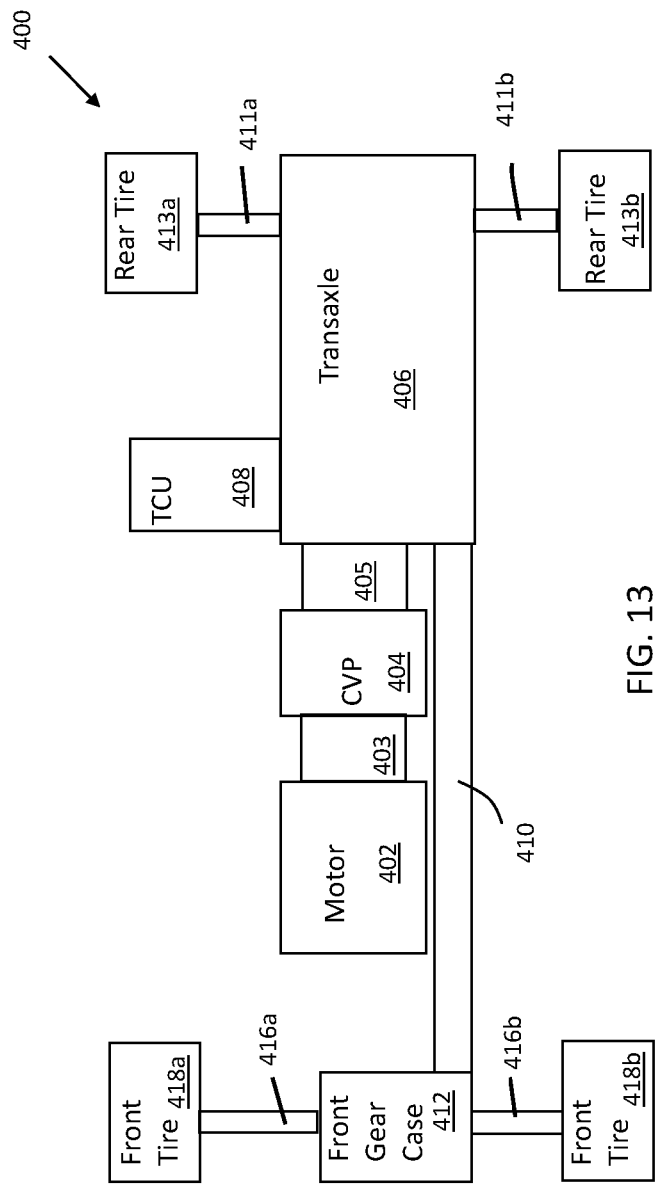
FIG. 13 illustrates a fourth vehicle layout according to an exemplary embodiment.

A fourth vehicle layout 400 example embodiment is illustrated in FIG. 13. Embodiments of layout 400 are similar as embodiments of layout 300 except a clutch 405 is located between a CVP 404 and the transaxle 406. A clutch 405 in this location may be used for a starter clutch and for a disengage clutch. This may be done with one clutch or two clutches.

In the fourth vehicle layout 400 example embodiment motor torque from motor 402 is provided to a gear reduction assembly 403 (chain and sprocket or gear set). The chain and sprocket or gear set 403 is operational coupled to an input side of the CVP 404. The CVP 404 may be controlled by an electric actuator that is tied to a transmission control unit (TCU) 408. In some embodiments the TCU 408 may also be integrated into the vehicle level controller or into the engine control unit (ECU).

As discussed above, in this fourth vehicle layout 400 embodiment of FIG. 13, the CVP 404 is connected a clutch 405 that may act as a starter clutch or a disengage clutch in embodiments. Clutch 405 in turn is operationally coupled to a transaxle 406. The transaxle 406 has a first output that is operationally coupled to a prop shaft 410. The prop shaft 410 is operationally coupled to a front gear case 412 which is operationally coupled to a pair of front wheels 418a and 418b via front shafts 416a and 416b. The transaxle 406 further has a pair of outputs operationally coupled to a pair of rear tires 413a and 413b via rear half shafts 411a and 411b in this example embodiment.

As discussed above, the CVP 404 is connected to a transaxle 410 via clutch 405. Clutch 405 may act as disengaging clutch that will be a normally closed or engaged clutch. For example, assume that when driving the vehicle 400 (forward or reverse) the CVP 404 rotates clockwise when looking at the input side of the CVP 404. The transmission/transaxle 406 between the CVP 404 and tires 413a, 413b, 418a and 418b takes care of forward or reverse so the CVP 404 may always operate in a CW direction in an embodiment. When the vehicle is going up a steep hill or rolling down a ramp or getting pushed around a garage, often times the CVP 404 may be forced to rotate in the opposite direction it normally spins when powering the vehicle 400. In this example, counter clockwise (CCW). One function of clutch 405 is to disengage the tires and the rest of the drivetrain 406, 410, 412 preventing the CVP 404 from rotating CCW. Therefore when it is determined electrically or mechanically or a combination of both that reverse rotation is present or imminent, clutch 405 will open up or disengage and decouple the CVP 404 from the rest of the drivetrain 406. 410, 412, thereby preventing the CVP 404 from rotating CCW.

Figure 14:
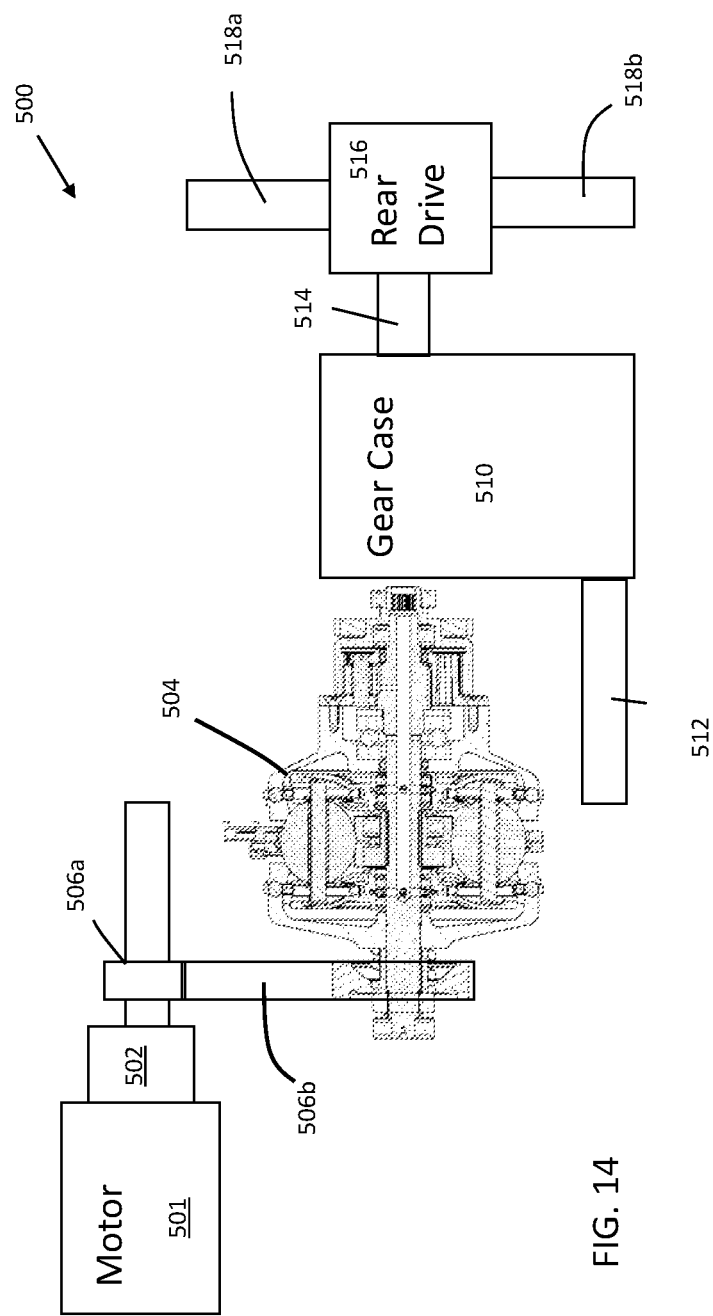
FIG. 14 illustrate a fifth vehicle layout according to an exemplary embodiment.

A fifth vehicle layout 500 example embodiment is illustrated in FIG. 14. The Fifth layout 500 embodiments are similar to the third layout 300 except that instead of a transaxle, gear case 510 would house a P-R-N-H-L or similar gear case with a prop first shaft 514 operatively connecting gear case 510 to a rear drive 516 (differential). The rear drive 516 is rotationally coupled to rear wheels via half shafts 518a and 518b.

Motor torque from motor 501 is provided to starter clutch 502 in the fifth layout 500 example embodiment of FIG. 14. This allows the motor 502 to idle without engaging the drivetrain. As the RPM of the motor 501 increases when the throttle is applied, the starter clutch 502 will engage. Any type of starter clutch 502 may be used in this embodiment including, but not limited to, a shoe style, a motorcycle style, mechanically or electrically engaged. Regardless, the starter clutch 502 engages as the motor 501 increases RPM and disconnects as the RPM decreases to allow the motor 502 to idle. In some embodiments a one-way clutch is included in this starter clutch area so engine braking through the drive is accomplished. Moreover in some embodiments, a torsional damper is included in the starter clutch area to smooth out the engine torque pulses.

In some embodiments of the fifth layout, a gear reduction (gears, belts or chains) are operationally coupled to the starter clutch. In the embodiment of FIG. 14 the gear reduction includes a gear/pulley 506a and belt 506a configuration. In these embodiments, the gear reduction is operationally coupled to an input side of the CVP 504. The CVP 504 may be controlled by an electric actuator that is tied to a transmission control unit. In some embodiments the TCU may also be integrated into the vehicle level controller or into the engine control unit (ECU). In this third layout embodiment, a CVP 504 output is operationally couple to a gear case 510 described above. The gear case 510 includes a first output operationally coupled to a first prop shaft 512 that is in turn operationally couple to a front drive assembly that may include a front differential, front half shafts, wheels and tires. The gear case 510 further includes a second output that is operationally coupled to a second prop shaft 514 that is in turn operationally coupled to a rear drive 516 as discussed above.

Sixth vehicle layout 600 layout example embodiments are illustrated in FIGS. 15-21. Layout 600 consists of a longitudinal mounted motor 601 as illustrated in the block diagram of FIG. 15. This could be an internal combustion engine, an electric motor or other type of torque generating motor. In this sixth layout 600 example, torque is provided by the motor 601 via a starter clutch 602. This allows the motor 601 to idle without engaging the drivetrain. As the motor 601 increases RPM when the throttle is applied, the starter clutch 602 will engage. This could be any type of starter clutch, shoe style, plate style, mechanically or electrically engaged. Regardless, it engages as the RPM of the motor 601 increases and disengages when motor RPM drops down to a certain level to allow the motor 601 to idle without delivering power to the wheels or stalling out the motor 601.

Figure 15:
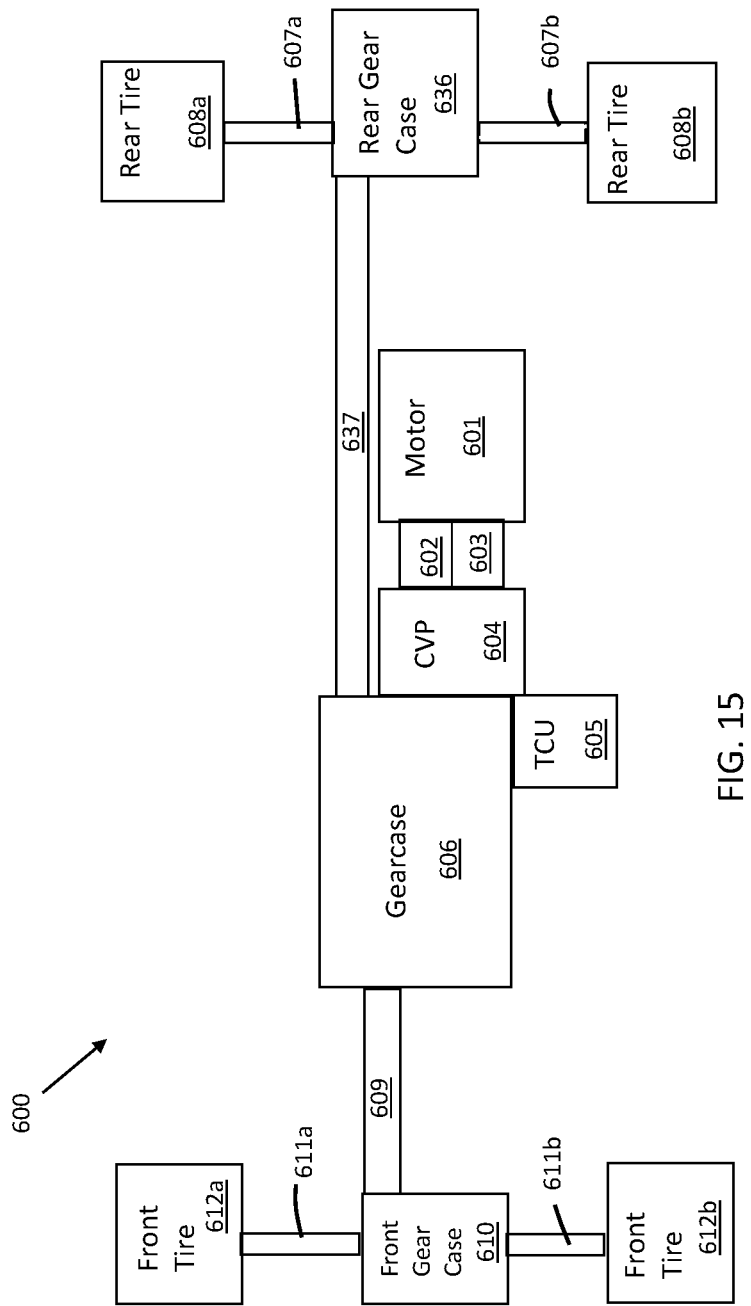
FIG. 15 illustrates a block diagram of the sixth vehicle layout according to an exemplary embodiment.

As further illustrated in the block diagram of FIG. 15, this example embodiment further includes a CVP 604 positioned to couple torque between the starter clutch 602 and the a gearcase 606 (transmission). The CVP 604 may be controlled by a TCU 605 as further discussed below. The gear case 606 is rotationally coupled to a rear gear case 636 via prop shaft 637 and a front gear case 610 via prop shaft 609. The rear gear case 636 is rotationally coupled to the rear tires/wheels 608a and 608b via rear half shafts 607a and 607b. The front gear case 610 is rotationally coupled to the front tires/wheels 612a and 612b via half shafts 611a and 611b.

Figure 16:
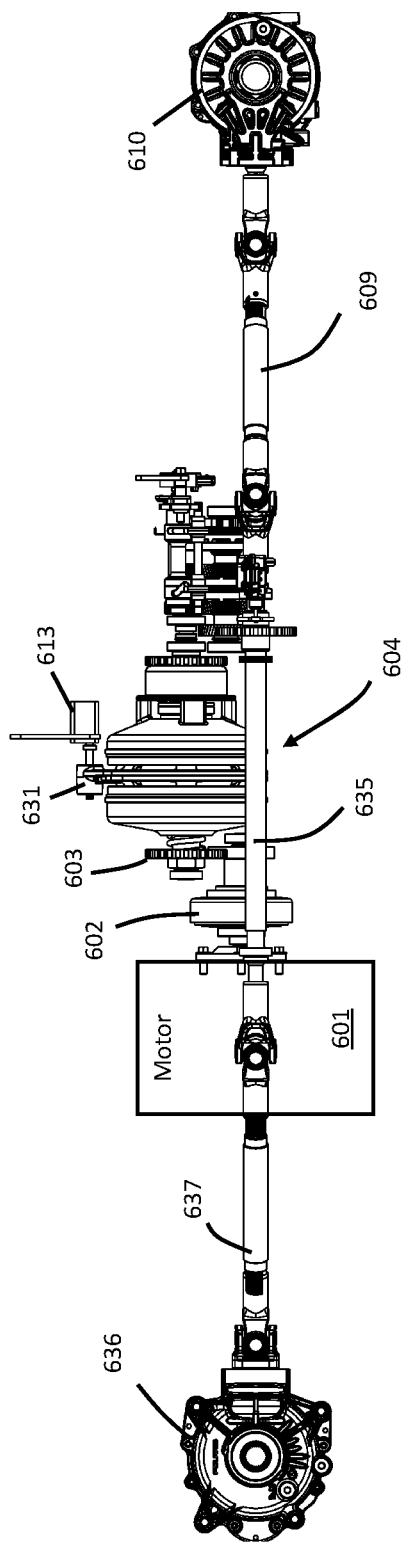
FIG. 16 is a side view of components of the sixth vehicle layout of FIG. 15.
Figure 17:
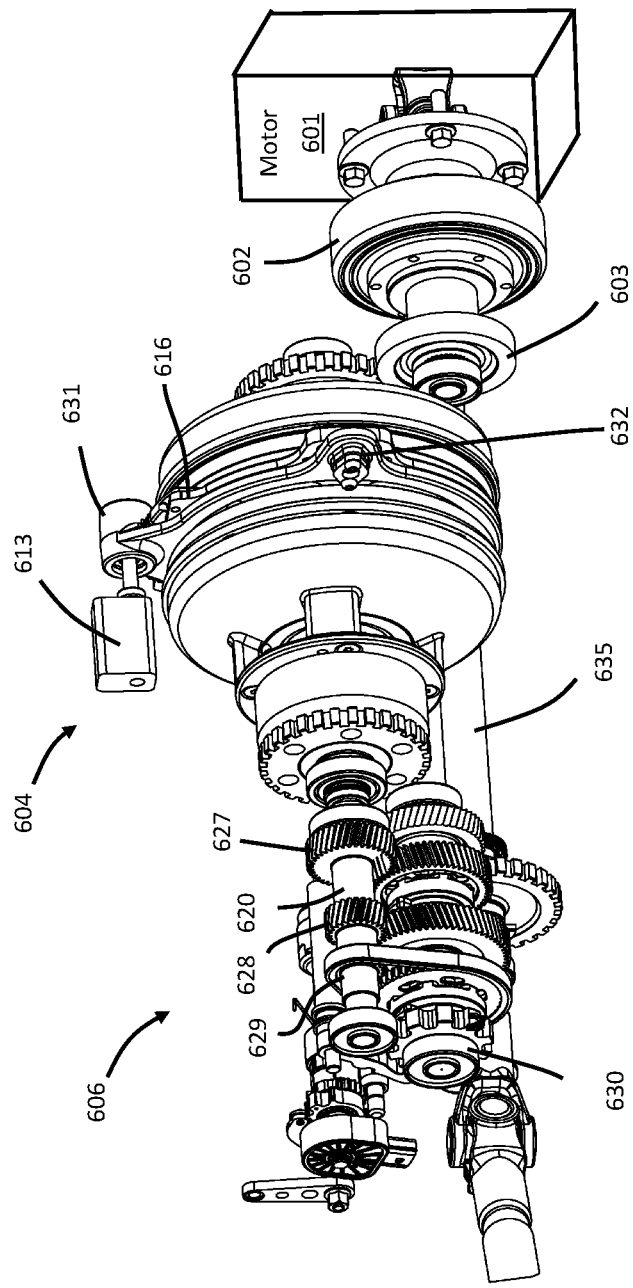
FIG. 17 is a side perspective view of the some components of the sixth vehicle layout of FIG. 15 including the CVP and gearcase according to an exemplary embodiment.
Figure 18:
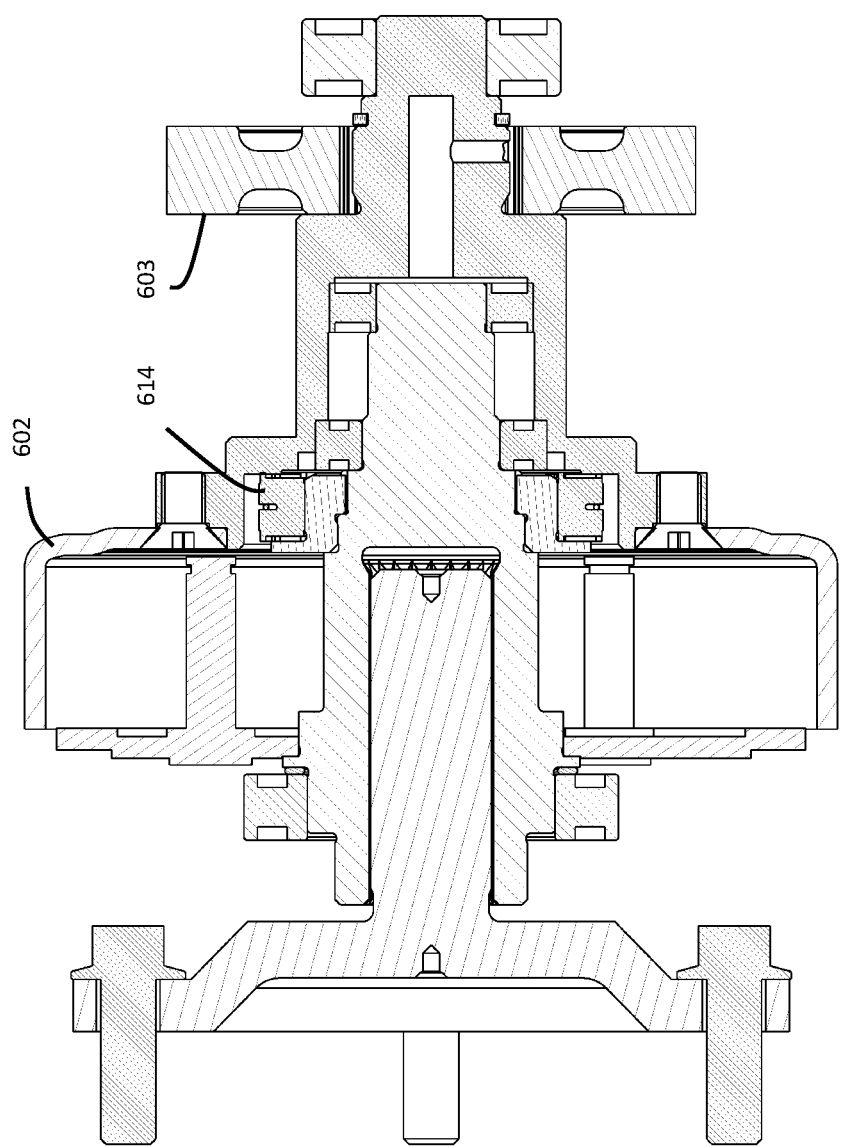
FIG. 18 is a cross-sectional side view of the starter clutch according to an exemplary embodiment.
Figure 19:
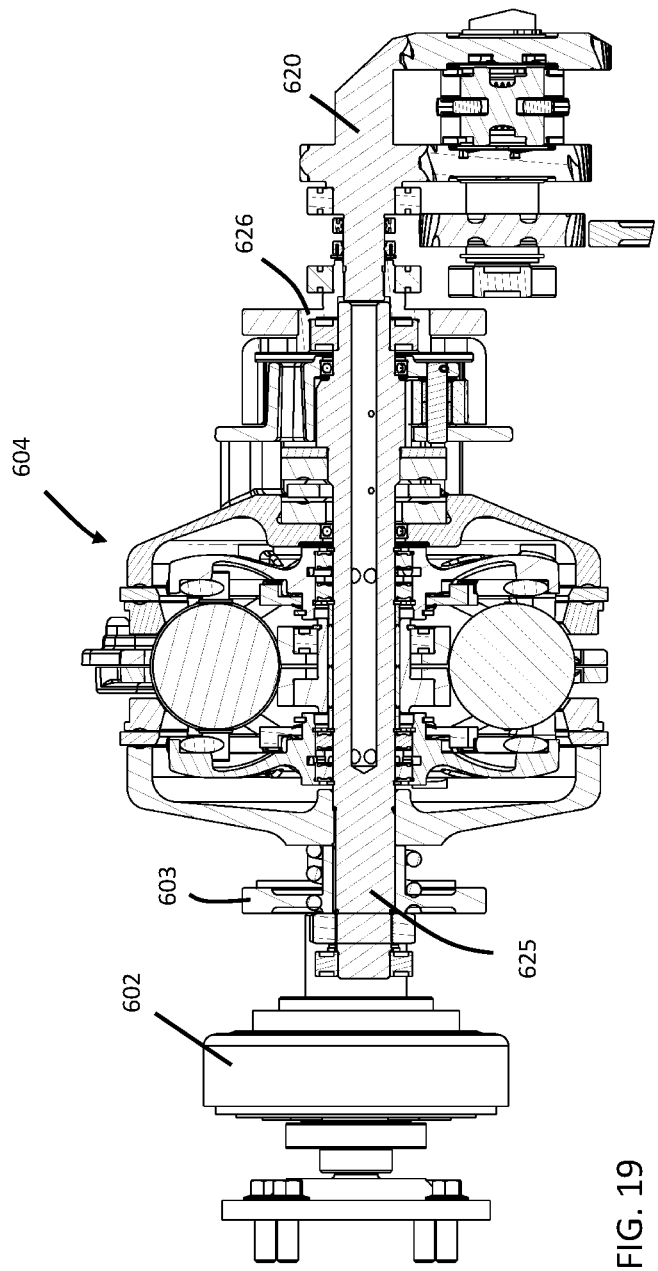
FIG. 19 is a close up cross-sectional side view of the CVP of the sixth vehicle layout of FIG. 15.
Figure 20:
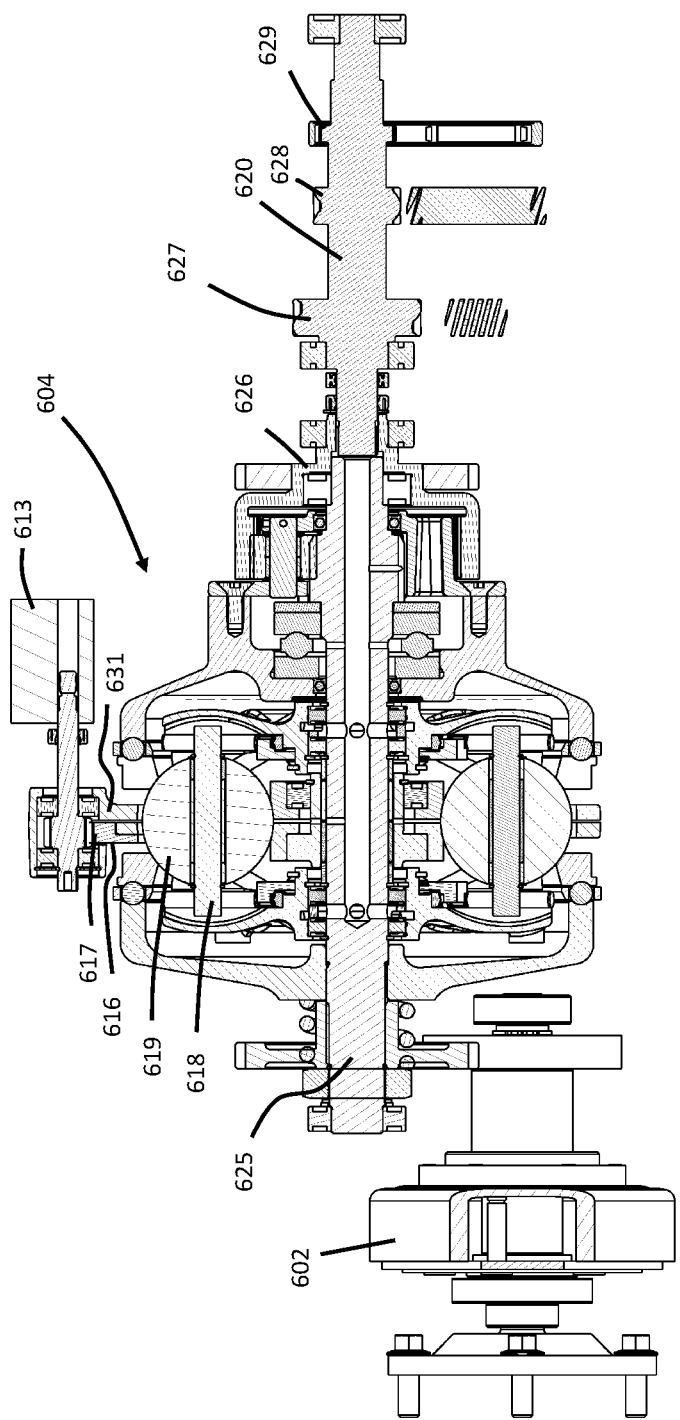
FIG. 20 is a close up cross-sectional side view of the CVP of the sixth vehicle layout of FIG. 15.
Figure 21:
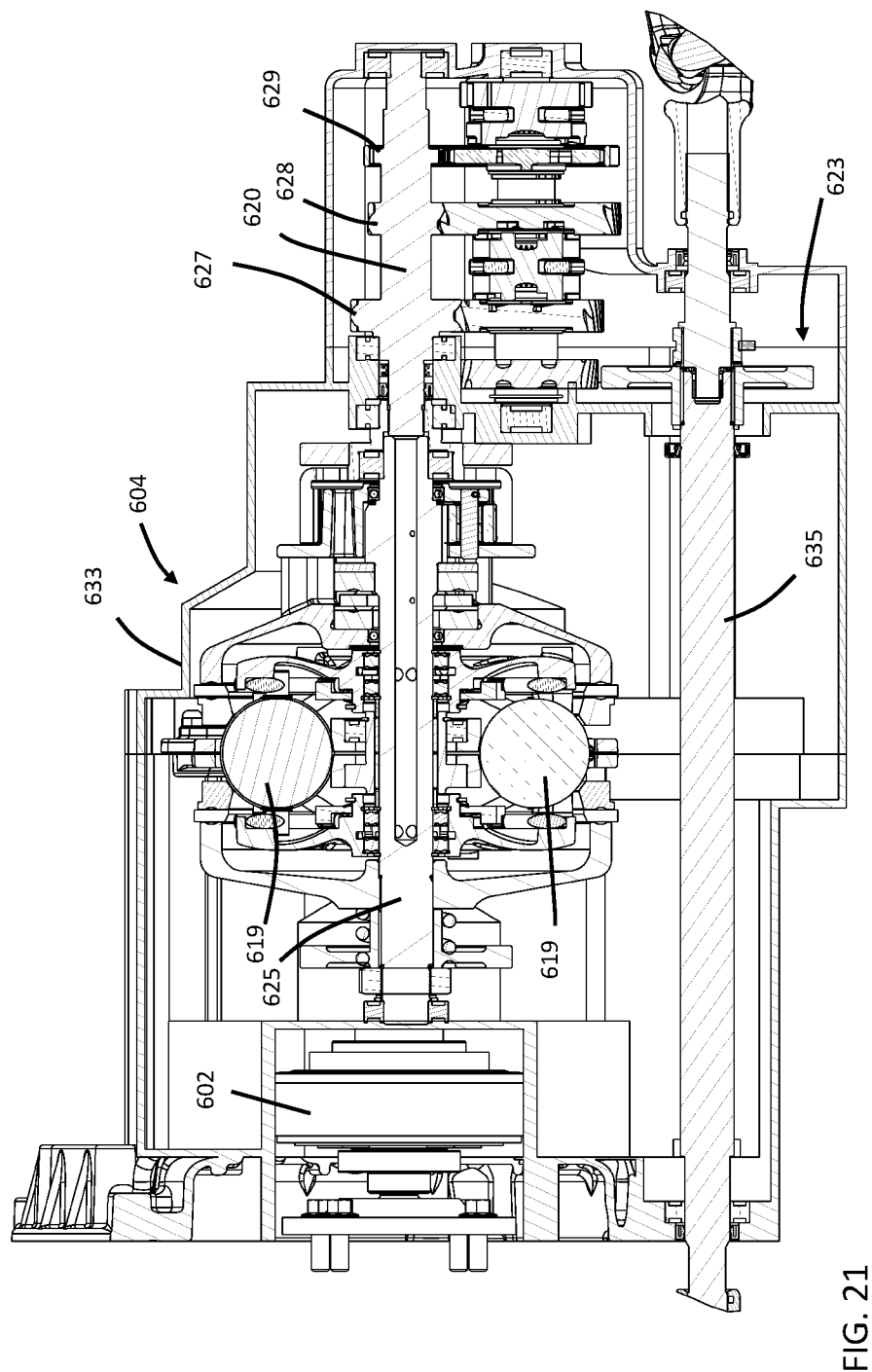
FIG. 21 is a side perspective view of some components of the sixth vehicle layout of FIG. 15 including the CVP and the starter clutch 602 according to an exemplary embodiment.

Further details of component embodiments of the sixth vehicle layout 100 are described in view of FIGS. 16-21. In particular, FIG. 16 illustrates a side view of components of the sixth vehicle layout 600. FIG. 17 illustrates side perspective view of the some components of the sixth vehicle layout 600 including the CVP 604 and gearcase 606 in an embodiment. FIG. 18 illustrates a cross-sectional side view of the starter clutch 602 in an embodiment. FIG. 19 illustrates a close up cross-sectional side view of the CVP. FIG. 20 is another close up cross-sectional side view of the CVP. FIG. 21 is a side perspective view of some components of the sixth vehicle layout 600 including the CVP 604 and the starter clutch 602.

In some embodiments a one-way clutch 614, best illustrated in FIG. 18, is included in this starter clutch area 602 to achieve engine braking through the drive. Moreover, in some embodiments a torsional damper is included in the starter clutch area 602 to smooth out the engine torque pulses. If an electric motor is used instead of an ICE, the starter clutch portion may not be necessary. In further some embodiments, after the starter clutch 602, the torque is run through a gear reduction assembly 603 (gears, belts or chains). In these embodiments, torque from the gear reduction assembly 603 will then run to an input side of CVP 604 and in particular, a main shaft 625 of the CVP 604 (illustrated in FIG. 19). Torque (power) flows through the NuVinci CVP 604 and exits the CVP 604 at a CVP Output 626. How the NuVinci CVP transfers power is well known in the industry and is not explained in detail here.

The CVP 604 is controlled in an embodiment by an electric actuator 613 as best illustrated in FIG. 17. The activation and position of the actuator 613 is controlled by a transmission control unit (TCU) 605 in an embodiment. In an embodiment, this TCU 605 may be integrated into the vehicle level controller or into the engine control unit (ECU). The body of the electric actuator 613 is connected to a transmission case 633 (illustrated in FIG. 21) in an embodiment. Further, in an embodiment, the electric actuator 613 is connected to a carrier 616 of the CVP 604 through gear teeth 617 as best illustrated in FIG. 20. A second carrier 631 is locked rotationally to the transmission case 633 at point 632 (illustrated in FIG. 17). As is well known in the area of the NuVinci CVP, as the first carrier 616 is moved or rotated about its axis the axles 618 of the balls 619 move to a different angle thereby changing the CVP ratio as best illustrated in FIG. 20. Many actuation methods exist to create the relative motion between the two carriers but the method of creating this relative motion between carriers is not restricted to this example.

The CVP output 626 is connected to a gearcase 606. In this assembly, the CVP output 626 is connected to the gearcase input shaft 620 as best illustrated in FIG. 19. This gearcase has high 627, low 628, reverse 629, neutral and park 630. The configuration of where these different gears are located on the shaft may be changed. Moreover, in an embodiment just one forward gear is implemented. Further in embodiments a mid-range forward gear is added. Park feature 630 in this assembly is a pawl style park but other types of a parking mechanism may be used. The gearcase 606 has outputs for the front prop shaft 609 and rear prop shaft 637. As illustrated in FIG. 17, in an embodiment, there is one output shaft 635 that both the front prop shaft 609 and rear prop shaft 637 connect to. There may be a separate shaft for the front prop shaft 609 and rear prop shaft 637. The front prop shaft 609 powers the front differential/gearcase 610. Front half shafts 611 take power from the front differential/gearcase 610 and deliver to the front tires 612 through front half shafts 611. The rear prop shaft 637 powers the rear differential/gearcase 636. Rear half shafts 607 take power from the rear differential/gearcase 636 and deliver to the rear tires 608 through rear half shaft 607.

The NuVinci drive needs oil to function correctly. In this sixth layout example the CVP 604 may be in a wet sump 622 having its own cavity and the gearcase 606 with a different oil and different sump 623. Oil routing would be similar to what was described in the first layout discussed above. Embodiments may also combine oils into one common sump or let the CVP cavity be a dry sump.

Figure 22:
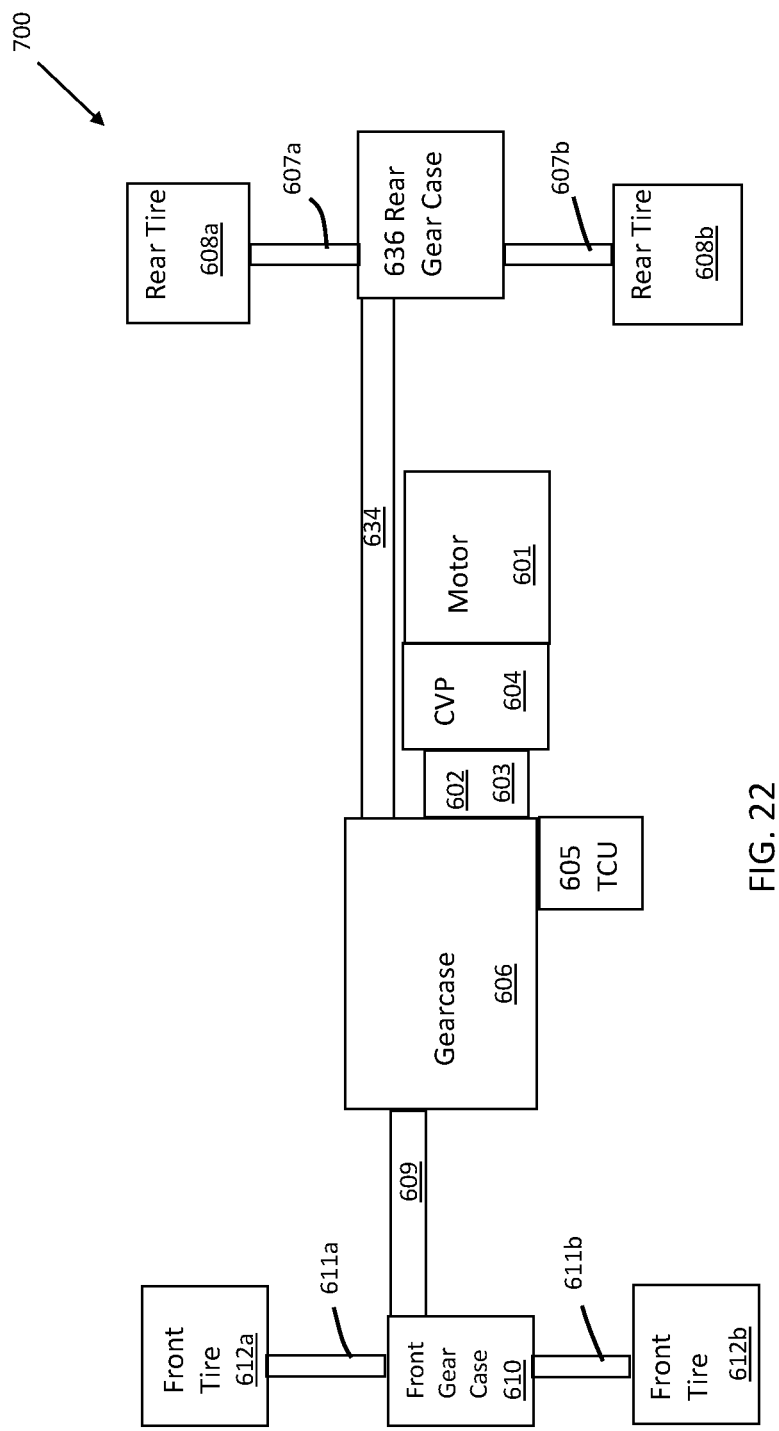
FIG. 22 illustrates a block diagram of a seventh vehicle layout according to an exemplary embodiment.

A seventh vehicle layout 700 example embodiment is illustrated in FIG. 22. Embodiments of seventh vehicle layout are similar as the sixth vehicle layout 600 discussed above. However, in the seventh vehicle layout 700 example, the starter clutch 602 is located between the CVP 604 and the gearcase 606. Having the clutch in this location allows the clutch to be used for a starter clutch and for a disengage clutch. This may be done with one clutch or two clutches.

EXAMPLE EMBODIMENTS

Example 1 is a vehicle layout including a motor, a continuously variable transmission (CVT), an actuator, a controller, a drivetrain and at least one clutch. The motor provides engine torque. The CVT is operationally coupled to receive the engine torque. The actuator is configured to control a gearing ratio of the CVT. The controller is configured to activate the actuator based at least in part on an input. The drivetrain is in operational communication with the CVT. The at least one clutch is configured to selectively disconnect torque between at least one of the motor and the CVT and the CVT and the drivetrain.

Example 2, includes the vehicle layout of Example 1, wherein the at least one clutch is positioned to disconnect the torque between the motor and the CVT.

Example 3 includes the vehicle layout of any of the Examples 1-2, wherein the at least one clutch is positioned to disconnect the torque between the CVT and the drivetrain.

Example 4 includes the vehicle layout of any of the Examples 1-3, wherein the at least one clutch is a starter clutch of one of a shoe style, plate style, mechanical style and electrical style.

Example 5 includes the vehicle layout of any of the Examples 1-4, further including a one-way clutch positioned to achieve engine braking.

Example 6 includes the vehicle layout of any of the Examples 1-5, further wherein the CVT is a continuously variable planetary (CVP) and the actuator is a CVP actuator.

Example 7 includes the vehicle layout of Example 6, further including a main shaft and oil inlet. The CVP is mounted on the main shaft. The main shaft has lubrication passages to distribute oil to different parts of the CVP. The oil inlet provides a fluid communication pathway to the lubrication passages.

Example 8 includes the vehicle layout of any of the Examples 1-7, wherein the drivetrain further includes at least one of a transaxle and a gearcase, at least front differential, a pair of front wheels and a pair of back wheels. The front differential is in rotational communication with the at least one transaxle and gearcase. Each front wheel in rotational communication with the front deferential. The pair of back wheels are rotational communication with the at least one transaxle and gear case.

Example 9 includes the vehicle layout of any of the Examples 1-8, further including a gear reduction assembly to communicatively couple rotation between the at least one clutch and one of the CVT and the drivetrain.

Example 10 includes the vehicle layout of any of the Examples 1-9, wherein the vehicle layout includes one of a transverse motor layout and a longitudinal motor layout.

Example 11 includes a vehicle layout including a motor, a continuously variable transmission (CVT), an actuator, a controller, a drivetrain and at least one starter clutch. The motor provides engine torque. The CVT is operationally coupled to receive the engine torque. The actuator is configured to control a gearing ratio of the CVT. The controller is configured to activate the actuator based at least in part on an input. The drivetrain is in operational communication with the CVT. The at least one starter clutch is positioned between the motor and CVT to selectively connect and disconnect torque between the motor and the CVT to allow the engine to idle without transferring torque to the drivetrain.

Example 12 includes the vehicle layout of Examples 11, further including a gear reduction assembly and a one-way clutch. The gear reduction assembly is used to communicate torque between the at least one starter clutch and the CVT. The one-way clutch is position between the at least on starter clutch and the gear reduction assembly to achieve engine braking.

Example 13 includes the vehicle layout of any of the Examples 11-12, wherein the CVT is a continuously variable planetary (CVP). The vehicle layout further including a main shaft and oil inlet. The CVP mounted on the main shaft. The main shaft has lubrication passages used to distribute oil to different parts of the CVP. The oil inlet provides a fluid communication pathway to the lubrication passages.

Example 14 includes the vehicle layout of any of the Examples 11-13, wherein the drivetrain further includes at least one of a transaxle and a gear case, at least a front differential, a pair of front wheels and a pair of back wheels. The at least a front differential is in rotational communication with the at least one transaxle and gear case. Each front wheel in rotational communication with the front deferential. The pair of back wheels are in rotational communication with the at least one transaxle and gear case.

Example 15 includes the vehicle layout of any of the Examples 11-14, further including a second clutch position between the CVT and the drivetrain to selectively disengage the drivetrain from the CVT to allow the CVT to selectively spin in a counter clockwise direction.

Example 16 includes a vehicle layout including a motor to provide engine torque, a continuously variable transmission (CVT), an actuator, a controller, a drivetrain and at least one clutch. The CVT is operationally coupled to receive the engine torque. The actuator is configured to control a gearing ratio of the CVT. The controller is configured to activate the actuator based at least in part on an input. The drivetrain is in operational communication with the CVT. The at least one clutch is positioned between the CVT and the drivetrain to selectively connect and disconnect torque between the CVT and the drivetrain.

Example 17 includes the vehicle layout of Example 16, further including a gear reduction assembly and a one way clutch. The gear reduction assembly is used to communicate torque between the at least one starter clutch and the CVT. The one-way clutch is position between the at least on starter clutch and the gear reduction assembly to achieve engine braking.

Example 18 includes the vehicle layout of the Example 16, further including a gear reduction assembly used to communicate torque between the motor and the CVT.

Example 19 includes the vehicle layout of any of the Examples 16-18, wherein the CVT is a continuously variable planetary (CVP). The vehicle layout further including a main shaft and an oil inlet. The CVP is mounted on the main shaft. The main shaft has lubrication passages to distribute oil to different parts of the CVP. The oil inlet provides a fluid communication pathway to the lubrication passages.

Example 20 includes the vehicle layout of any of the Examples 16-19, wherein the drivetrain further includes at least one of a transaxle and a gear case, at least a front differential, a pair of front wheels and a pair of rear wheels. The front differential is in rotational communication with the at least one transaxle and gear case. Each front wheel is in rotational communication with the front deferential. The pair of back wheels are in rotational communication with the at least one transaxle and gear case.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vehicle layout comprising:
a motor to provide engine torque;
a continuously variable transmission (CVT) operationally coupled to receive the engine torque;
an actuator configured to control a gearing ratio of the CVT;
a controller configured to activate the actuator based at least in part on an input;
a drivetrain in operational communication with the CVT;
at least one clutch configured to selectively disconnect torque between the motor and the CVT, wherein the at least one clutch is one of a shoe style, plate style and an electrical style; and
a first gear reduction assembly to communicate torque between the motor and the CVT.

2. The vehicle layout of claim 1, wherein the at least one clutch is positioned to disconnect the torque between the motor and the CVT.

3. The vehicle layout of claim 1, further comprising:
at least one second clutch positioned to disconnect the torque between the CVT and the drivetrain.

4. The vehicle layout of claim 3, further comprising:
a second gear reduction assembly to communicatively couple torque between the CVT and the drivetrain.

5. The vehicle layout of claim 1, further comprising:
a one-way clutch positioned between the motor and the CVT to achieve engine braking.

6. The vehicle layout of claim 1, further wherein the CVT is a continuously variable planetary (CVP) and the actuator is a CVP actuator.

7. The vehicle layout of claim 6, further comprising:
a main shaft, the CVP mounted on the main shaft, the main shaft having lubrication passages to distribute oil to different parts of the CVP; and
an oil inlet providing a fluid communication pathway to the lubrication passages.

8. The vehicle layout of claim 1, wherein the drivetrain further comprises:
at least one of a transaxle and a gearcase;
at least a front differential in rotational communication with the at least one transaxle and gearcase;
a pair of front wheels, each front wheel in rotational communication with the front differential; and
a pair of back wheels in rotational communication with the at least one transaxle and gear case.

9. The vehicle layout of claim 1, wherein the vehicle layout includes one of a transverse motor layout and a longitudinal motor layout.

10. A vehicle layout comprising:
a motor to provide engine torque;
a continuously variable transmission (CVT) operationally coupled to receive the engine torque;
an actuator configured to control a gearing ratio of the CVT;
a controller configured to activate the actuator based at least in part on an input;
a drivetrain in operational communication with the CVT;
at least one starter clutch positioned between the motor and CVT to selectively connect and disconnect torque between the motor and the CVT to allow the engine to idle without transferring torque to the drivetrain, wherein the at least one starter clutch is one of a shoe style, plate style and an electrical style;
a first gear reduction assembly to communicate torque between the motor and the CVT; and
a one-way clutch positioned between the at least one starter clutch and the first gear reduction assembly to achieve engine braking.

11. The vehicle layout of claim 10, further comprising:
a second gear reduction assembly to communicate torque between the CVT and the drivetrain.

12. The vehicle layout of claim 10, wherein the CVT is a continuously variable planetary (CVP), the vehicle layout further comprising:
a main shaft, the CVP mounted on the main shaft, the main shaft having lubrication passages to distribute oil to different parts of the CVP; and
an oil inlet providing a fluid communication pathway to the lubrication passages.

13. The vehicle layout of claim 10, wherein the drivetrain further comprises:
at least one of a transaxle and a gear case;
at least a front differential in rotational communication with the at least one transaxle and gear case;
a pair of front wheels, each front wheel in rotational communication with the front differential; and
a pair of back wheels in rotational communication with the at least one transaxle and gear case.

14. The vehicle layout of claim 10, further comprising:
a second clutch position between the CVT and the drivetrain to selectively disengage the drivetrain from the CVT to allow the CVT to selectively spin in a counter clockwise direction.

\* \* \* \* \*